(12) United States Patent
Minami et al.

(10) Patent No.: US 11,654,707 B2
(45) Date of Patent: May 23, 2023

(54) PRINTING DEVICE CREATING PRINT DATA DIFFERENTIATED IN COLOR DEVELOPMENT STATE DEPENDING ON VIEWING DIRECTION OF MULTI-LAYER MEDIUM

(71) Applicant: BROTHER KOGYO KABUSHIKI KAISHA, Nagoya (JP)

(72) Inventors: Akira Minami, Nagoya (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/561,587

(22) Filed: Dec. 23, 2021

(65) Prior Publication Data
US 2022/0203743 A1 Jun. 30, 2022

(30) Foreign Application Priority Data
Dec. 28, 2020 (JP) .............................. JP2020-218945

(51) Int. Cl.
*B41J 2/355* (2006.01)
*B41M 5/34* (2006.01)
(Continued)

(52) U.S. Cl.
CPC .............. *B41M 5/34* (2013.01); *B41J 2/3551* (2013.01); *B41J 2/3558* (2013.01); *B41M 5/38214* (2013.01); *G06K 15/028* (2013.01)

(58) Field of Classification Search
CPC ... B41J 2/35; B41J 2/355; B41J 2/3553; B41J 2/3556; B41J 2/3558; B41J 2/32;
(Continued)

(56) References Cited

U.S. PATENT DOCUMENTS 7,298,387 B2 * 11/2007 Busch .................... B41J 2/3555
347/194
9,387,714 B2 * 7/2016 Sugiyama ................ B41M 5/28
(Continued)

FOREIGN PATENT DOCUMENTS

| JP | 2008-006830 A | 1/2008 |
| JP | 2020-15315 A | 1/2020 |
| WO | 02/096665 A1 | 12/2002 |

*Primary Examiner* — Kristal Feggins
(74) *Attorney, Agent, or Firm* — Kenealy Vaidya LLP

(57) ABSTRACT

A printing device is configured to print a multi-layer thermal printing medium. The printing device includes a thermal head and a controller. The thermal head has a heat generating elements configured to form images on a heat sensitive multi-layer. The controller is configured to perform detecting whether a viewing direction of the heat sensitive multi-layer is a thickness direction to view from a second surface toward a first surface or a direction opposite the thickness direction to view from the first surface toward the second surface. The controller is configured to further perform creating print data to be applied to each of the heat generating elements. The created print data is such that color development states of a first color and a second color according to the detected viewing direction are differentiated from color development states of the first color and the second color according to an undetected viewing direction.

16 Claims, 11 Drawing Sheets

(51) Int. Cl.
*G06K 15/02* (2006.01)
*B41M 5/382* (2006.01)

(58) Field of Classification Search
CPC ...... B41J 29/393; B41J 2/3551; B41J 2/3555; G06K 15/028; B41M 5/34; B41M 5/38214
See application file for complete search history.

(56) References Cited

U.S. PATENT DOCUMENTS

| | | | |
|---|---|---|---|
| 2003/0125206 A1* | 7/2003 | Bhatt | .................. B41M 5/34 503/201 |
| 2020/0016905 A1 | 1/2020 | Tsuchiya et al. | |

* cited by examiner

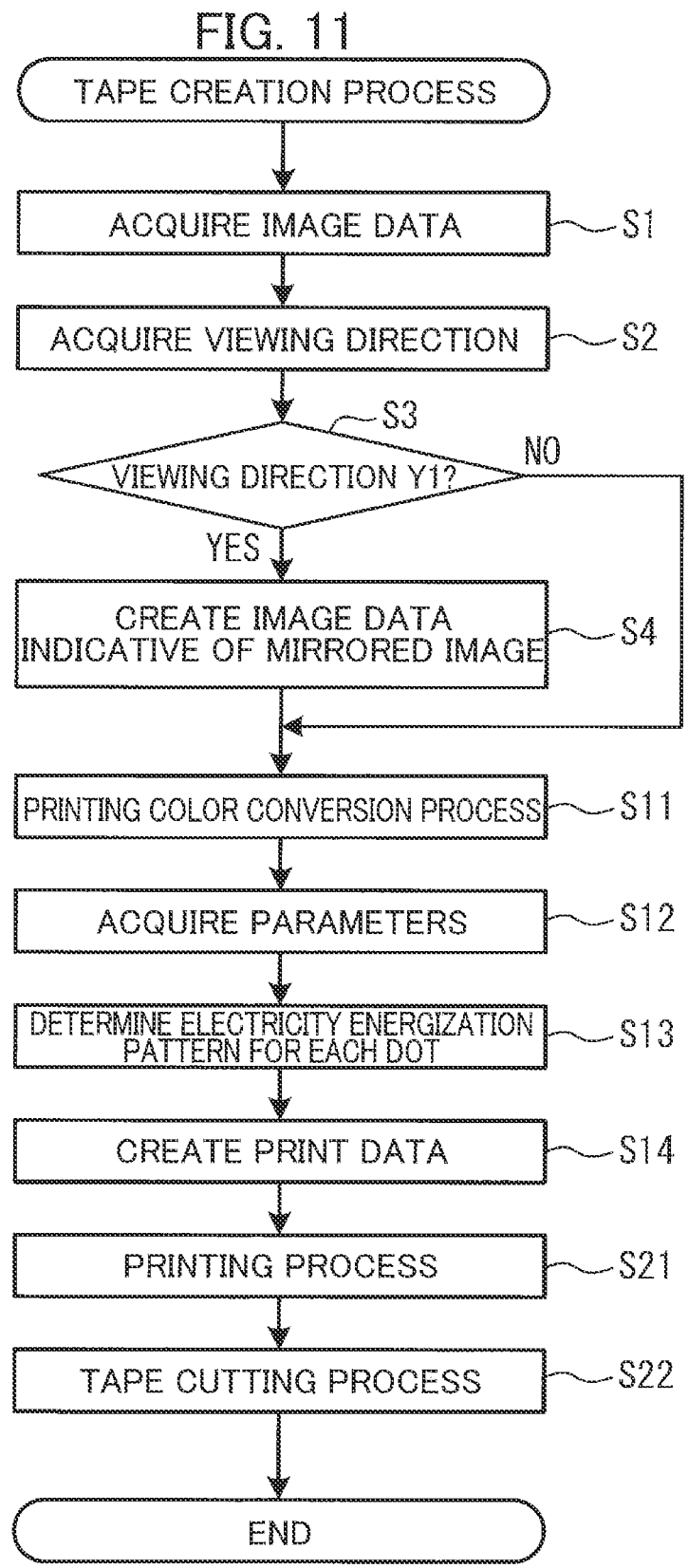

PRINTING DEVICE CREATING PRINT DATA DIFFERENTIATED IN COLOR DEVELOPMENT STATE DEPENDING ON VIEWING DIRECTION OF MULTI-LAYER MEDIUM

CROSS REFERENCE TO RELATED APPLICATION

This application claims priority from Japanese Patent Application No. 2020-218945 filed Dec. 28, 2020. The entire content of the priority application is incorporated herein by reference.

BACKGROUND

There has been known a printing device configured to perform printing on a multi-layered heat sensitive printing medium in which a plurality of heat sensitive layers having chromogenic property different from each other are formed on a base layer. For example, printing is performed on a printing medium where a third image forming layer, a second spacer layer, a second image forming layer, a first spacer layer, a first image forming layer, and a protection layer are successively formed on a base layer in this order. An image formed on each image forming layer is observed in a direction from the protection layer to the base layer.

SUMMARY

However, with the conventional printer described above, in case of employment of a transparent base layer, a color tone of the resultant image on the image forming layers when observed from the side of the base layer is different from a color tone of the resultant image when observed from the side of the protection layer.

In view of the foregoing, it is an object of the disclosure to provide a printing device capable of generating print data configured to form an image whose color developing state is controllable depending on the direction of visual observation and characteristic or property of the base layer, etc.

Another object of the disclosure is to provide a storage medium storing therein the print data generating program.

In order to attain the above and other objects, according to one aspect, the disclosure provides a printing device configured to print a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The printing device includes a thermal head and a controller. The thermal head has a plurality of heat generating elements configured to form images on the heat sensitive multi-layer. The controller is configured to perform detecting whether a viewing direction of the heat sensitive multi-layer is the thickness direction to view from the second surface toward the first surface or a direction opposite the thickness direction to view from the first surface toward the second surface. The controller is configured to further perform creating, based on pixel-based image data, print data to be applied to each of the plurality of heat generating elements. The controller is configured to further perform driving selected ones of the plurality of heat generating elements to form images on the heat sensitive multi-layer in response to the print data. In the creating, the created print data is such that color development states of the first color and the second color according to the detected viewing direction are differentiated from color development states of the first color and the second color according to an undetected viewing direction.

According to this configuration, the controller can create print data capable of changing color developing state of a resultant image depending on the viewing direction. Hence, for example, the printing device can form an image such that a color tone of the image when viewing the heat sensitive multi-layer in the thickness direction from the second surface toward the first surface through the base layer and a color tone of the image when viewing the heat sensitive multi-layer in the direction opposite the thickness direction from the first surface toward the second surface are approximately equal to each other. That is, according to the printing device, the color tone of the resultant image can be approximated regardless of the viewing direction.

According to another aspect, the disclosure provides a printing device configured to print a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The printing device includes a thermal head and a controller. The thermal head has a plurality of heat generating elements configured to form images on the heat sensitive multi-layer. The controller is configured to perform detecting whether a viewing direction of the heat sensitive multi-layer is the thickness direction to view from the second surface toward the first surface or a direction opposite the thickness direction to view from the first surface toward the second surface. The controller is configured to further perform creating, based on pixel-based image data, print data to be applied to each of the plurality of heat generating elements. The controller is configured to further perform driving selected ones of the plurality of heat generating elements to form images on the heat sensitive multi-layer in response to the print data. In the creating, the created print data is such that color development states of the first color and the second color according to the detected relevant information on the thickness of the base layer are differentiated from color development states of the first color and the second color according to an undetected relevant information on the thickness of the base layer.

According to this configuration, the controller can create print data capable of changing color developing state of a resultant image depending on the detected relevant information on the thickness of the base layer. Hence, when viewing the heat sensitive multi-layer in the thickness direction from the second surface toward the first surface through the base layer, the printing device can approximate a color tone of the resultant image regardless of the thickness of the base layer.

According to still another aspect, the disclosure provides a printing device configured to print a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The printing device includes a thermal head and a controller. The thermal head has a plurality of heat generating elements configured to form images on the heat sensitive multi-layer. The controller is configured to perform detecting Whether a viewing direction of the heat sensitive multi-layer is the thickness direction to view from the second surface toward the first surface or a direction opposite the thickness direction to view from the first surface toward the second surface. The controller is configured to further perform creating, based on pixel-based image data, print data to be applied to each of the plurality of heat generating elements. The controller is configured to further perform driving selected ones of the plurality of heat generating elements to form images on the heat sensitive multi-layer in response to the print data. In the creating, the created print data is such that color development states of the first color and the second color according to the detected relevant information on refractive index of the base layer are differentiated from color development states of the first color and the second color according to an undetected relevant information on refractive index of the base layer.

According to this configuration, the controller can create print data capable of changing color developing state of a resultant image depending on the detected relevant information on refractive index of the base layer. Hence, when viewing the heat sensitive multi-layer in the thickness direction from the second surface toward the first surface through the base layer, the printing device can approximate a color tone of the resultant image regardless of the refractive index of the base layer.

According to still another aspect, the disclosure provides a non-transitory computer readable storage medium storing a set of computer-readable instructions creating print data installed on and executed by a computer provided in a printing device. The printing device includes a thermal head having a plurality of heat generating elements. The computer is configured to drive the plurality of heat generating elements. The print data is used for printing image on a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The set of computer-readable instructions includes: detecting whether a viewing direction of the heat sensitive multi-layer is the thickness direction to view from the second surface toward the first surface or a direction opposite the thickness direction to view from the first surface toward the second surface; acquiring the viewing direction detected in the detecting; and creating, based on pixel-based image data, the print data to be applied to each of the plurality of heat generating elements, the created print data being such that color development states of the first color and the second color according to the detected viewing direction are differentiated from color development states of the first color and the second color according to an undetected viewing direction.

According to this configuration, the computer can create print data capable of changing color developing state of a resultant image depending on the viewing direction. Hence, for example, the printing device can form an image such that a color tone of the image when viewing the heat sensitive multi-layer in the thickness direction from the second surface toward the first surface through the base layer and a color tone of the image when viewing the heat sensitive multi-layer in the direction opposite the thickness direction from the first surface toward the second surface are approximately equal to each other. That is, according to the printing device, the color tone of the resultant image can be approximated regardless of the viewing direction.

According to still another aspect, the disclosure provides a non-transitory computer readable storage medium storing a set of computer-readable instructions creating print data installed on and executed by a computer provided in a printing device. The printing device includes a thermal head having a plurality of heat generating elements. The computer is configured to drive the plurality of heat generating elements. The print data is used for printing image on a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The set of computer-readable instructions includes: detecting relevant information on the thickness of the base layer; and creating, based on pixel-based image data, print data to be applied to each of the plurality of heat generating elements, the created print data being such that color development states of the first color and the second color according to the detected relevant information on the thickness of the base layer are differentiated from color development states of the first color and the second color according to an undetected relevant information on the thickness of the base layer.

According to this configuration, the computer can create print data capable of changing color developing state of a resultant image depending on the detected relevant information on the thickness of the base layer. Hence, when viewing the heat sensitive multi-layer in the thickness direction from the second surface toward the first surface through the base layer, the printing device can approximate a color tone of the resultant image regardless of the thickness of the base layer.

According to still another aspect, the disclosure provides a non-transitory computer readable storage medium storing a set of computer-readable instructions creating print data installed on and executed by a computer provided in a printing device. The printing device includes a thermal head having a plurality of heat generating elements. The computer is configured to drive the plurality of heat generating elements. The print data is used for printing image on a multi-layer thermal printing medium. The multi-layer thermal printing medium includes a base layer and a heat sensitive multi-layer. The base layer has visible light transparency. The base layer has thickness in a thickness direction. The base layer has a first surface orthogonal to the thickness direction and a second surface opposite the first surface. The heat sensitive multi-layer is formed on the first surface as a whole. The heat sensitive multi-layer includes a first heat sensitive layer and a second heat sensitive layer. The first heat sensitive layer has visible light transparency. The first heat sensitive layer is colored into a first color when heated to a temperature equal to or higher than a first temperature. The second heat sensitive layer has visible light transparency. The second heat sensitive layer is colored into a second color when heated to a temperature equal to or higher than a second temperature higher than the first temperature. The second heat sensitive layer is positioned farther in the thickness direction than the first heat sensitive layer from the base layer. The set of computer-readable instructions includes: detecting relevant information on refractive index of the base layer; and creating, based on pixel-based image data, print data to be applied to each of the plurality of heat generating elements, the created print data being such that color development states of the first color and the second color according to the detected relevant information on refractive index of the base layer are differentiated from color development states of the first color and the second color according to an undetected relevant information on refractive index of the base layer.

According to this configuration, the computer can create print data capable of changing color developing state of a resultant image depending on the detected relevant information on refractive index of the base layer. Hence, when viewing the heat sensitive multi-layer in the thickness direction from the second surface toward the first surface through the base layer, the printing device can approximate a color tone of the resultant image regardless of the refractive index of the base layer.

BRIEF DESCRIPTION OF THE DRAWINGS

The particular features and advantages of the embodiment(s) as well as other objects will become apparent from the following description taken in connection with the accompanying drawings, in which:

FIG. 11 is a flowchart illustrating a tape creation process.

DETAILED DESCRIPTION

A thermal printer 1 as one example of a printing device according to one embodiment of the present disclosure will be described with reference to the accompanying drawings. In the following description, a diagonally lower left side, a diagonally upper right side, a diagonally lower right side, a diagonally upper left side, an upper side, and a lower side in FIG. 1 are respectively defined as a front side, a rear side, a right side, a left side, an upper side and a lower side of the thermal printer 1.

Figure 2:
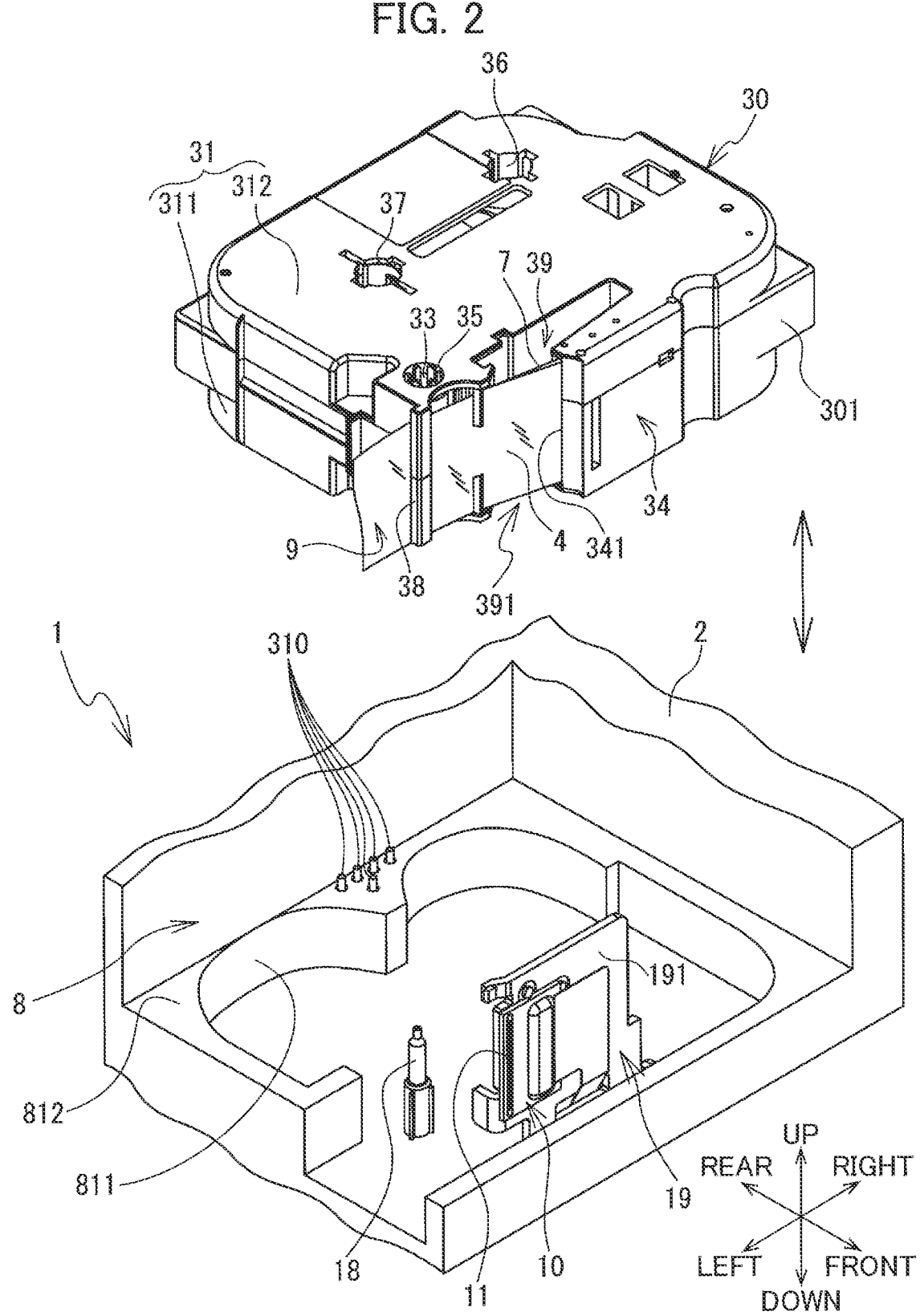
FIG. 2 is a perspective view of a receiving portion of the thermal printer and a tape cassette.

Further, a diagonally lower right side, a diagonally upper left side, a diagonally upper right side, a diagonally lower left side, an upper side, and a lower side in FIG. 2 are respectively defined as a front side, a rear side, a right side, a left side, an upper side, and a lower side of a tape cassette 30 attachable to a receiving portion 8 of the thermal printer 1. Further, in FIG. 3, a delineation of an upper case 312 (see FIG. 2) of the tape cassette 30 is omitted for facilitating understanding to an attached state of the tape cassette 30 to the receiving portion 8.

Figure 1:
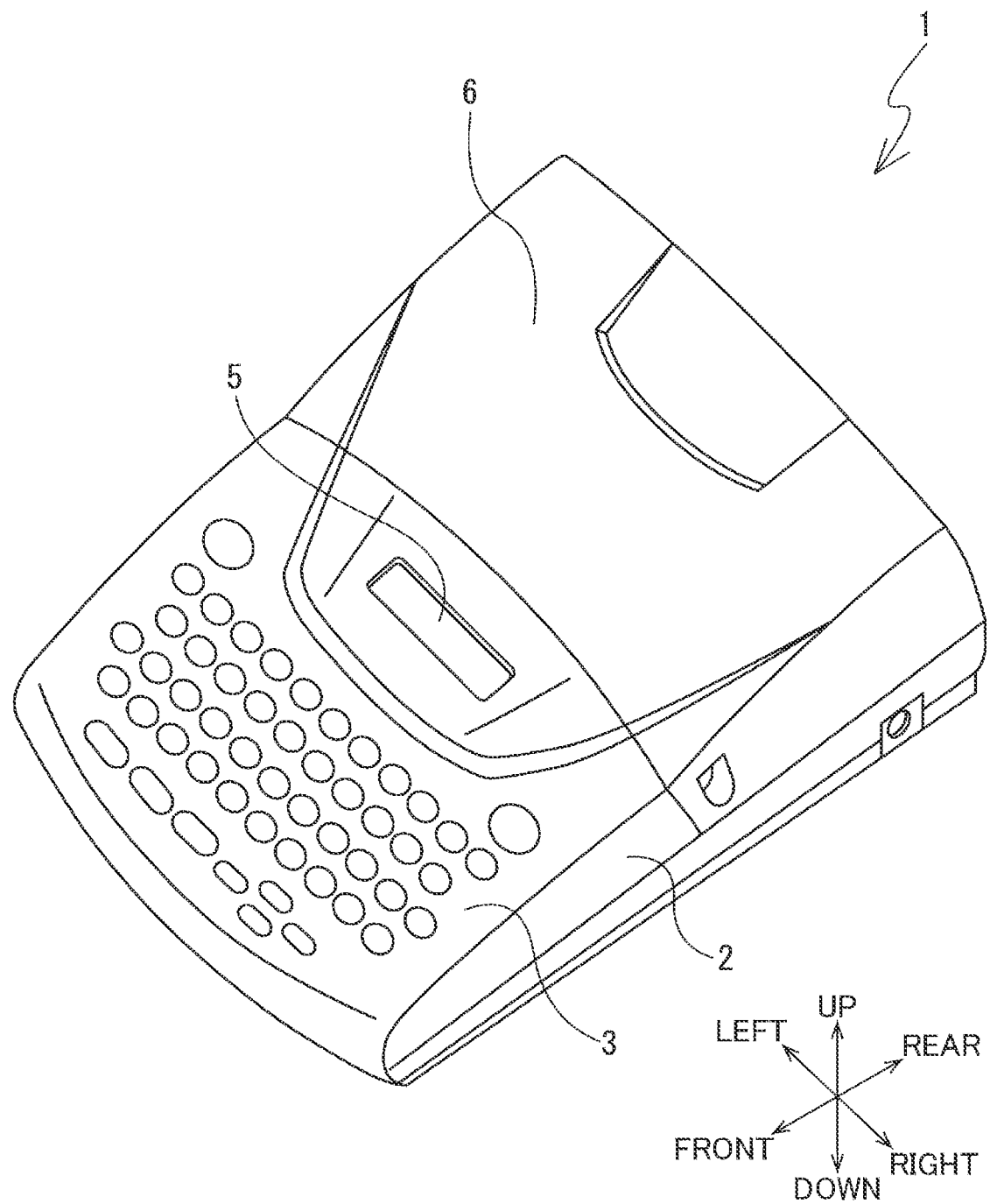
FIG. 1 is a perspective view of a thermal printer.

The thermal printer 1 illustrated in FIG. 1 according to the embodiment is an universal type tape printer to which various types of tape cassettes such as a receptor type and laminate type tape cassette is attachable and usable. Incidentally, the receptor type tape cassette stores therein a heat sensitive tape having one surface adhered with a release tape through an adhesive layer.

The receptor type tape cassette stores therein a roll of the heat sensitive tape and a roll of a double-sided adhesive tape. In the following description, the thermal printer 1 employs the laminate type tape cassette 30 illustrated in FIG. 2. The thermal printer 1 is configured to form an image such as letter, figure, and mark on the heat sensitive tape 4. The thermal printer 1 produces a tape 9 by sticking an adhesive tape 7 to the heat sensitive tape 4 on which an image is formed.

An external structure of the thermal printer 1 will be described. As illustrated in FIG. 1, the thermal printer 1 includes a housing 2 having a box-like shape. A keyboard 3 is provided on an upper front portion of the housing 2. The keyboard 3 is configured to allow a user to input various information. A display 5 is positioned rearward of the keyboard 3. The display 5 is configured to display various information input by the user.

A cassette cover 6 is provided rearward of the display 5. The cassette cover 6 is positioned above the receiving portion 8 (see FIG. 2) to open and close the receiving portion 8. An ejection slit (not illustrated) is formed on a left rear portion of the housing 2. The ejection slit is configured to allow the tape 9 to be discharged out of the thermal printer 1.

An internal structure of the thermal printer 1 will next be described. As illustrated in FIG. 2, the receiving portion 8 is positioned below the cassette cover 6. The receiving portion 8 has a shape in conformance with the tape cassette 30, and is recessed downward from an upper surface of the housing 2. The tape cassette 30 is attachable to and detachable from the receiving portion 8.

The receiving portion 8 has a cavity 811 and an edge supporting portion 812. The cavity 811 is recessed downward and has a shape in conformance with the shape of a bottom surface of a cassette case 31 described later when the tape cassette 30 is attached to the receiving portion 8. The cavity 811 has a flat bottom surface. The edge supporting portion 812 has a flat surface portion extending horizontally from an outer edge of the cavity 811. The edge supporting portion 812 supports the lower peripheral surface of the cassette case 31 when the tape cassette 30 is attached to the receiving portion 8.

A head holder 19 is positioned on a front portion of the receiving portion 8. The head holder 19 has a plate-like shape extending in an upward/downward direction and a leftward/rightward direction. The head holder 19 has a front surface 191 on which a thermal head 10 is provided.

The thermal head 10 includes a plurality of heat generating elements 11. The heat generating elements 11 are arrayed in line in the upward/downward direction. As described later, the cassette case 31 of the tape cassette 30 has an opening portion 341. The plurality of heat generating elements 11 of the thermal head 10 is configured to heat the heat sensitive tape 4 exposed to an outside of the cassette case 31 through the opening portion 341 in the attached state of the tape cassette 30 to the receiving portion 8.

A drive shaft 18 is positioned diagonally leftward and rearward of the head holder 19 for conveying the heat sensitive tape 4 and the adhesive tape 7. The drive shaft 18 extends upward from the bottom surface of the receiving portion 8, and is rotationally driven by a conveyer motor 95 (see FIG. 6).

Five medium detection switches 310 are provided on the edge supporting portion 812 at a rear portion of the receiving portion 8. Each medium detection switch 310 has a pin-like shape urged by a spring to maintain upper protruding position protruding upward from the upper surface of the edge supporting portion 812.

Figure 3:
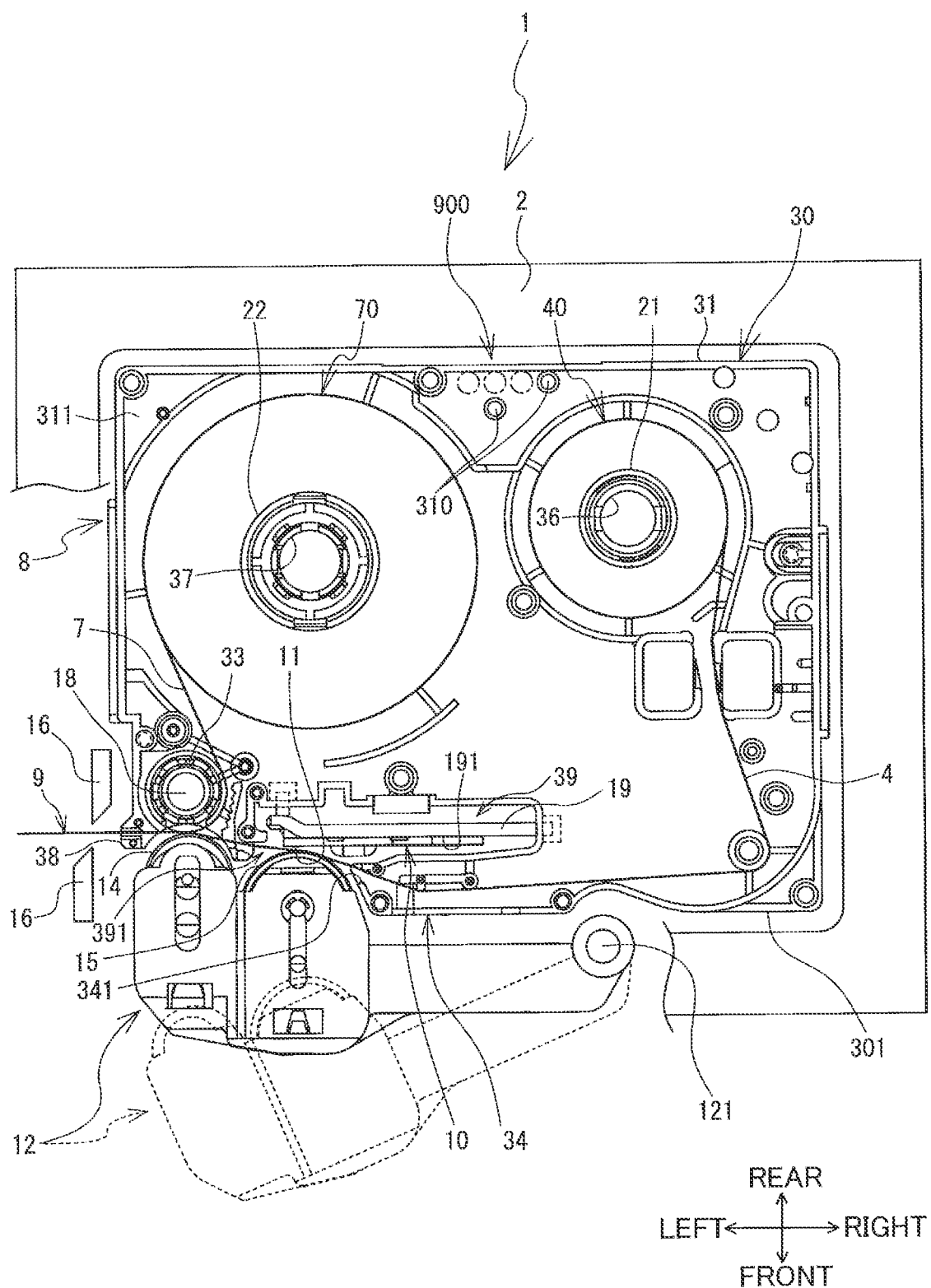
FIG. 3 is a plan view of the receiving portion to which the tape cassette is attached.

The tape cassette 30 includes a medium indicating portion 900 (see FIG. 3). In case of attachment of the tape cassette 30 to the receiving portion 8, the medium detection switches 310 are selectively depressed downward by the medium indicating portion 900. The medium detection switch 310 is rendered OFF when the medium detection switch 310 is not depressed downward, and is rendered ON when the medium detection switch 310 is depressed downward. The thermal printer 1 detects a kind of the tape 9 on a basis of a combination of ON and OFF of the medium detection switches 310. Kind of the tape 9 and details of the medium indicating portion 900 will be described later.

As illustrated in FIG. 3, a cutter mechanism 16 is positioned leftward of the drive shaft 18. The cutter mechanism 16 is driven to cut the tape 9 by driving a cutter motor 96 (see FIG. 6). A platen holder 12 is positioned frontward of the head holder 19. The platen holder 12 has an arm shape, and is pivotally movable about an axis of a support shaft 121 extending in the upward/downward direction. The support shaft 121 is provided on a right end portion of the platen holder 12.

The platen holder 12 has a tip end portion where a platen roller 15 and a movable roller 14 are rotatably supported. The platen roller 15 is movable toward and away from the thermal head 10 in response to the pivotal movement of the platen holder 12. The tape cassette 30 includes a conveyer roller 33 described later. The movable roller 14 is positioned leftward of the platen roller 15, and is movable toward and away from the conveyer roller 33 in response to the pivotal movement of the platen holder 12.

The platen holder 12 is movable between a standby position as indicated by a dotted line in FIG. 3 in response to opening motion of the cassette cover 6 and a printing position indicated by a solid line in FIG. 3 in response to closing motion of the cassette cover 6. In the standby position, the platen holder 12 is moved in the direction away from the receiving portion 8. Hence, the user can attach or detach the tape cassette 30 to and from the receiving portion 8.

In the printing position, the platen holder 12 is moved toward the receiving portion 8. Hence, in the attached state of the tape cassette 30 to the receiving portion 8, the platen roller 15 presses against the heat sensitive tape 4 toward the thermal head 10, and the movable roller 14 presses against the heat sensitive tape 4 and the adhesive tape 7 superposed therewith toward the conveyer roller 33.

The platen roller 15 is rotated together with the drive shaft 18 rotated by the conveyer motor 95. Incidentally, rotation speed of the platen roller 15 is set smaller than the rotation speed of the drive shaft 18 and the conveyer roller 33 in order to restrain a slack of the heat sensitive tape 4 due to conveyance of the heat sensitive tape 4. To this effect, the platen roller 15 and the drive shaft 18 are drivingly connected to the conveyer motor 95 through a plurality of gears (not illustrated).

Next, a structure of the tape cassette 30 will be described. As illustrated in FIG. 2, the tape cassette 30 includes the cassette case 31 having a rectangular parallelepiped shape, and includes the upper case 312 and a lower case 311.

An arm portion 34 is provided on a front surface 301 of the cassette ease 31. The arm portion 34 extends diagonally frontward and leftward from a front right portion of the cassette case 31. The arm portion 34 has a left end where the opening portion 341 is formed. The opening portion 341 has a slit shape extending in the upward/downward direction allowing the heat sensitive tape 4 paid out from a first supply roll (see FIG. 3) described later to discharge through the opening portion 341 out of the cassette case 31. Hence, a part of the heat sensitive tape 4 is exposed to an outside of the cassette case 31.

A head insertion portion 39 is provided rearward of the arm portion 34. The head insertion portion 39 extends throughout a thickness of the cassette case 31 in the upward/downward direction. The head insertion portion 39 has a front left open end. The open end will be referred to as a "head opening 391". The head opening 391 is positioned downstream of the opening portion 341 in a conveying direction of the heat sensitive tape 4, i.e., the head opening 391 is positioned leftward of the opening portion 341. The head holder 19 is inserted in the head insertion portion 39 in the attached state of the tape cassette 30 to the receiving portion 8.

The conveyer roller 33 is positioned leftward of the head insertion portion 39. The conveyer roller 33 is positioned between the opening portion 341 and a guide portion 38 described later in the conveying direction (leftward/rightward direction). The conveyer roller 33 is hollow cylindrical and extends in the upward/downward direction.

The conveyer roller 33 has a front end portion exposed to the outside and protrudes frontward from the cassette case 31. The conveyer roller 33 is configured to support the adhesive tape 7 in a superposed state of the heat sensitive tape 4 with the adhesive tape 7. The upper case 312 of the cassette case 31 is formed with a support hole 35 extending throughout a thickness of the upper case 312 in the upward/downward direction. The conveyer roller 33 is rotatably supported by the support hole 35.

The conveyer roller 33 has a hollow space in which the drive shaft 18 is insertable upon attachment of the tape cassette 30 to the receiving portion 8 as illustrated in FIG. 3. The conveyer roller 33 is rotated by the rotation of the drive shaft 18 to convey the heat sensitive tape 4 and the adhesive tape 7.

The guide portion 38 is provided on a front left corner portion of the cassette case 31. The guide portion 38 is positioned downstream (leftward) of the opening portion 341 in the conveying direction. Specifically, the guide portion 38 is positioned downstream of the conveyer roller 33 in the conveying direction. The guide portion 38 is in the form of a slit extending in the upward/downward direction. The tape 9 moved past the conveyer roller 33 passes through the guide portion 38. At this time, the guide portion 38 supports upper and lower edges of the tape 9 in the widthwise direction. Hence, a posture of the tape 9 can be maintained when the tape 9 is discharged out of the cassette case 31. That is, the guide portion 38 is configured to guide the tape 9 toward an outside of the cassette case 31.

The upper case 312 of the cassette case 31 is formed with a support hole 36 and a support hole 37 those extending throughout a thickness of the upper case 312 in the upward/downward direction. A first tape spool 21 is rotatably supported by the support hole 36. A second tape spool 22 is rotatably supported by the support hole 37.

Figure 4A:
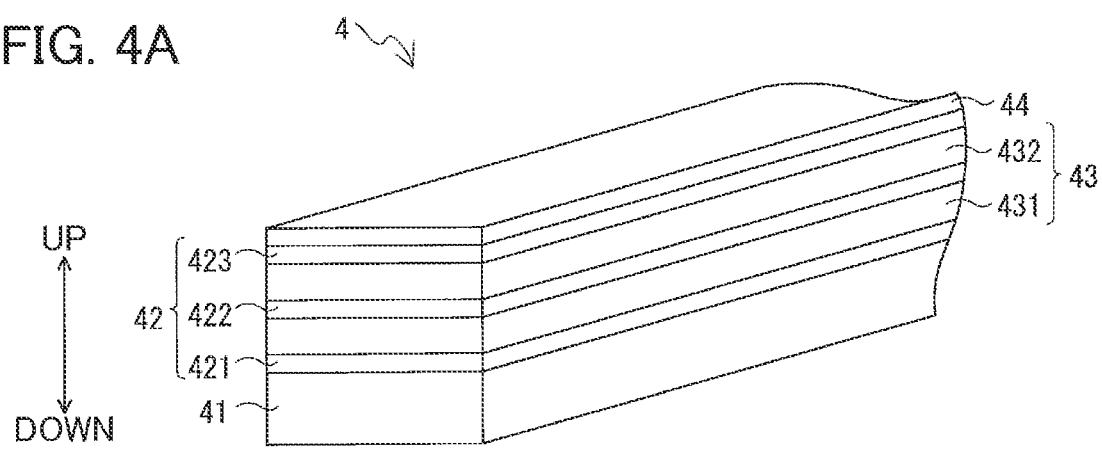
FIG. 4A is a perspective view of a heat sensitive tape.

As illustrated in FIG. 3, the cassette case 31 accommodates therein the first supply roll 40 and a second supply roll 70. The first supply roll 40 is a supply source of the heat sensitive tape 4, and is positioned at a rear right internal portion of the cassette case 31. The heat sensitive tape 4 is spirally wound over the first tape spool 21 in a clockwise direction in plan view to provide the first supply roll 40. Specifically, as described later in detail, the heat sensitive tape 4 has a multi-layer construction including a base layer 41 (FIG. 4A) and a plurality of heat sensitive layers 42 (FIG. 4A). The heat sensitive tape 4 is wound over the first tape spool 21 such that the plurality of heat sensitive layers 42 is positioned radially inward of the base layer 41.

The second supply roll 70 is a supply source of the adhesive tape 7, and is positioned at a rear left internal portion of the cassette case 31. That is, the second supply roll 70 is positioned leftward of the first supply roll 40. The adhesive tape 7 is spirally wound over the second tape spool 22 in a counterclockwise direction in plan view to provide the second supply roll 70. Specifically, as described later in detail, the adhesive tape 7 has a multi-layer construction including a first adhesive layer 73 (FIG. 4B) and a second adhesive layer 74 (FIG. 4A). The adhesive tape 7 is wound over the second tape spool 22 such that the first adhesive layer 73 is positioned radially inward of the second adhesive layer 74.

The medium indicating portion 900 includes at least one bore portion. The medium indicating portion 900 is provided on a rear bottom wall of the lower case 311 at a position to face the medium detection switches 310 in case of attachment of the tape cassette 30 to the receiving portion 8. Numbers and relative positions of the bores of the medium indicating portion 900 are changed depending on the kinds of the tape 9 accommodated in the tape cassette 30.

Upon attachment of the tape cassette 30 to the receiving portion 8, the medium detection switch 310 aligned with the bore is not depressed to provide OFF state whereas the other medium detection switch 310 offset from the bore is depressed by the surface of the lower case 311 to provide ON state. Hence, the thermal printer 1 detects the numbers and positions of the bores of the medium indicating portion 900 by the medium detection switches 310, to thus specify the kind of the tape 9.

Next, a structure of the heat sensitive tape 4 will be described. In the following description, an upper side and a lower side in FIGS. 4A through 4C will be referred to as an upper side and a lower side of the tape. As illustrated in FIG. 4A, the heat sensitive tape 4 is an elongated tape medium, and has a multi-layered construction. Specifically, the heat sensitive tape 4 includes the base layer 41, the plurality of heat sensitive layers 42, a plurality of heat insulation layers 43, and an overcoat layer 44. The plurality of heat sensitive layers 42 includes a first heat sensitive layer 421, a second heat sensitive layer 422, and a third heat sensitive layer 423. The plurality of heat insulation layers 43 includes a first heat insulation layer 431 and a second heat insulation layer 432.

The base layer 41, the first heat sensitive layer 421, the first heat insulation layer 431, the second heat sensitive layer 422, the second heat insulation layer 432, the third heat sensitive layer 423, and the overcoat layer 44 are successively layered in this order in a thickness direction of the heat sensitive tape 4 such that the base layer 41 is a lowermost layer and the overcoat layer 44 is an uppermost layer. The overcoat layer 44 is positioned opposite to the base layer 41 with respect to the plurality of heat sensitive layers 42.

The base layer 41 is a resin film, and specifically, non-foaming resin film, and more specifically, non-foaming polyethylene terephthalate (PET) film. That is, no foam is contained in the base layer 41.

Each layer of the plurality of heat sensitive layers 42 is configured to develop each color when the layer is heated to each coloring temperature, Chemicals described in Japanese Patent Application Publication No. 2008-6830 are used for the plurality of heat sensitive layers 42.

The first heat sensitive layer 421 is a membrane of a chemical coated on a lower surface of the first heat insulation layer 431. Upon heating the first heat sensitive layer 421 to a temperature equal to or higher than a first temperature, the first heat sensitive layer 421 is colored into a first color whose visible light transmittance is lower than the visible light transmittance of the first heat sensitive layer 421 prior to heating. Cyan "C" is an example of the first color.

The second heat sensitive layer 422 is a membrane of a chemical coated on a lower surface of the second heat insulation layer 432. Upon heating the second heat sensitive layer 422 to a temperature equal to or higher than a second temperature, the second heat sensitive layer 422 is colored into a second color whose visible light transmittance is lower than the visible light transmittance of the second heat sensitive layer 422 prior to heating. The second temperature is higher than the first temperature. Magenta "M" is an example of the second color.

The third heat sensitive layer 423 is a membrane of a chemical coated on an upper surface of the second heat insulation layer 432, Upon heating the third heat sensitive layer 423 to a temperature equal to or higher than a third temperature, the third heat sensitive layer 423 is colored into a third color whose visible light transmittance is lower than the visible light transmittance of the third heat sensitive layer 423 prior to heating. The third temperature is higher than the second temperature. Yellow "Y" is an example of the third color.

The plurality of heat insulation layers 43 is of a sheet-like form. The heat insulation layers 43 function as resistors against heat conduction, since the heat insulation layers 43 have low thermal conductivity. Accordingly, temperature gradient is formed in each heat insulation layer 43 in a direction of a thickness of the heat insulation layer 43, i.e., in a direction of heat conduction.

As described later, in a case where the thermal head 10 heats the heat sensitive tape 4 from above the heat sensitive tape 4 in FIG. 4A, a temperature at a lower surface of each heat insulation layer 43 is lower than the temperature at an upper surface of each heat insulation layer 43. Hence, each heat insulation layer 43 can provide a predetermined temperature difference between the heat sensitive layers 42 positioned immediately above and immediately below the heat insulation layer 43 in accordance with the thermal conductivity of the heat insulation layer 43.

Specifically, the second heat insulation layer 432 is configured to provide the temperature of the second heat sensitive layer 422 lower than the temperature of the third heat sensitive layer 423, and the first heat insulation layer 431 is configured to provide the temperature of the first heat sensitive layer 421 lower than the temperature of the second heat sensitive layer 422. As such, in the heat sensitive tape 4, the heat insulation layers 43 can intentionally control the temperature of the first heat sensitive layer 421 equal to or higher than the first temperature and lower than the second temperature, the temperature of the second heat sensitive layer 422 equal to or higher than the second temperature and lower than the third temperature, and the temperature of the third heat sensitive layer 423 equal to or higher than the third temperature.

The overcoat layer 44 is a membrane coated on an upper surface of the third heat sensitive layer 423. The overcoat layer 44 is likely to permit the blue visible light (for example, light having wavelength of about 470 nm) to transmit therethrough, rather than the transmission of yellow visible light (for example, light having wavelength of about 580 nm). That is, the overcoat layer 44 has an optical transparency for yellow visible light lower than that for blue visible light. The overcoat layer 44 protects the plurality of heat sensitive layers 42 at a position opposite to the base layer 41, i. e., at the upper surface of the heat sensitive tape 4.

The heat sensitive tape 4 in its entirety provides visible light transmittance in the thickness direction of the heat sensitive tape 4. That is, each layer of the heat sensitive tape 4 has visible light transmittance. The base layer 41 may have a percent transmission (%) equal to that of at least one of the plurality of heat sensitive layers 42, the plurality of heat insulation layers 43, and the overcoat layer 44, or may have the percent transmission different from that of any one of the layers.

Each layer of the heat sensitive tape 4 has a percent transmission for the visible light equal to or higher than 90%, preferably, equal to or higher than 99%, and more preferably, equal to or higher than 99.9%. However, each layer of the heat sensitive tape 4 may have a percent transmission for the visible light lower than 90% as long as the user can visually recognize the coloring of the heat sensitive layers 42 through the base layer 41. Each layer of the heat sensitive tape 4 is transparent or translucent. Preferably, each layer of the heat sensitive tape 4 is transparent.

The base layer 41 has a refractive index higher than that of the first heat insulation layer 431, and specifically, higher than that of any one of the heat insulation layers 43.

Incidentally, the thickness of each layer of the heat sensitive tape 4 and difference in thickness of each layer are schematically illustrated in FIG. 4A for facilitating understanding to the embodiment. Real thickness and real difference in thickness of each layer are not in conformance with the thickness illustrated in FIG. 4A. The same is true with respect to FIGS. 4B through 5B. For example, the thickness of the overcoat layer 44 may be greater than or equal to or smaller than the thickness of each of the heat sensitive layers 42.

Figure 4B:
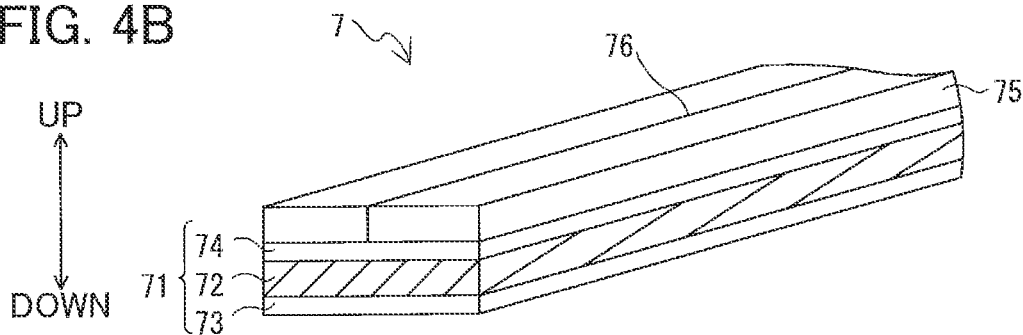
FIG. 4B is a perspective view of an adhesive tape.

A structure of the adhesive tape 7 will next be described with reference to FIG. 4B. The adhesive tape 7 is an elongated tape-like medium having a multi-layered construction. Specifically, the adhesive tape 7 includes a double-sided adhesive tape 71 and a release sheet 75. The double-sided adhesive tape 71 has a white color, and includes a sheet 72, the first adhesive layer 73, and the second adhesive layer 74. The sheet 72 has a white color. Incidentally, in FIGS. 4B, 4C and 5B hatching indicates white color of the sheet 72. The sheet 72 has a visible light percent transmission lower than that of each layer of the heat sensitive tape 4.

The first adhesive layer 73 is provided on a lower surface of the sheet 72, and the second adhesive layer 74 is provided on an upper surface of the sheet 72. That is, the double-sided adhesive tape 71 is constituted by coating each surface of the sheet 72 with an adhesive agent.

The release sheet 75 is stuck to the double-sided adhesive tape 71 through the second adhesive layer 74. The release sheet 75 has a cut line 76. The cut line 76 extends in a longitudinal direction of the adhesive tape 7 and divides the release sheet 75 into two section in a short direction of the release sheet 75. Incidentally, the cut line 76 may be entered into a part of the double-sided adhesive tape 71, but does not reach the first adhesive layer 73. That is, the sheet 72 is continuous crossing the cut line 76. In other words, the double-sided adhesive tape 71 is continuous crossing the cut line 76.

A structure of the tape 9 will next be described with reference to FIG. 4C. The tape 9 is provided by sticking the lower surface of the adhesive tape 7 to the upper surface of the heat sensitive tape 4 where an image is formed. In the tape 9, the base layer 41, the first heat sensitive layer 421, the first heat insulation layer 431, the second heat sensitive layer 422, the second heat insulation layer 432, the third heat sensitive layer 423, the overcoat layer 44, the first adhesive layer 73, the sheet 72, the second adhesive layer 74, and the release sheet 75 are successively layered in this order in a thickness direction of the tape 9 such that the base layer 41 is an lowermost layer and the release sheet 75 is an uppermost layer.

Figure 4C:
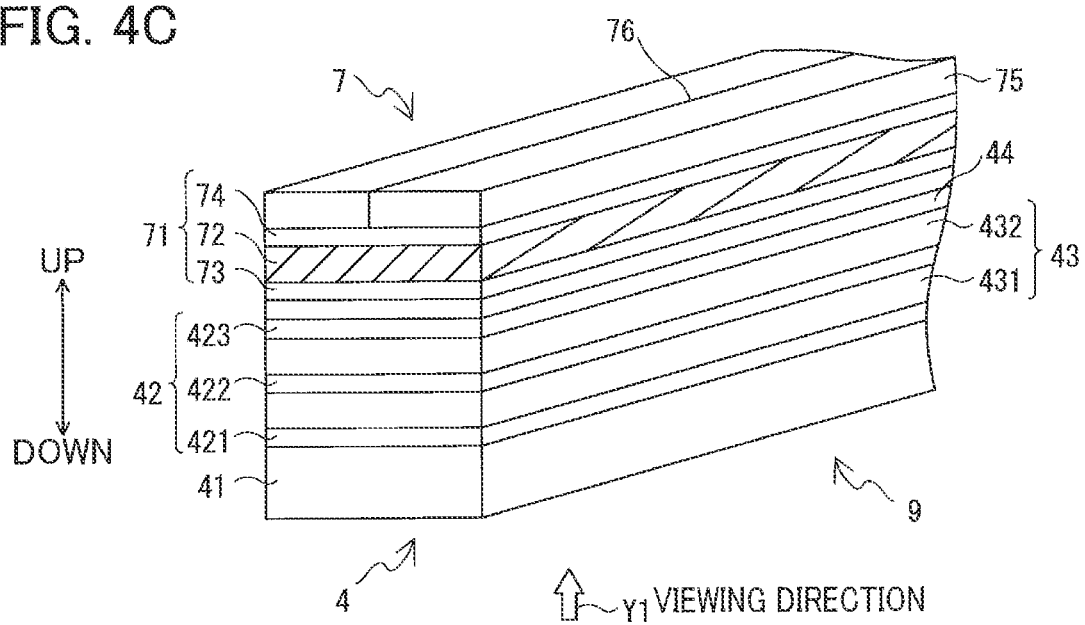
FIG. 4C is a perspective view of a tape.

The user observes the tape 9 from a base layer 41 side (from the lowermost side of the tape 9) as indicated by an arrow Y in FIG. 4C. Since the heat sensitive tape 4 in its entirety provides visible light transmittance, the user can observe a color image (printed image) formed on each heat sensitive layer 42 and a background white color of the double-sided adhesive tape 71 through the base layer 41 when the user observes the tape 9 from the base layer 41 side. The user can use the tape 9 by peeling off the release sheet 75 from the double-sided adhesive tape 71 and sticking the double-sided adhesive tape 71 of the tape 9 to a wall or a paperboard, or the like.

Incidentally, in a case where the user observes the tape 9 in the direction from the double-sided adhesive tape 71 to the heat sensitive layers 42, i.e., from the adhesive tape 7 side after peeling off the release sheet 75 from the double-sided adhesive tape 71, the user cannot observe the coloring developed in each heat sensitive layer 42, i.e., the user cannot observe the printed color image, since the double-sided adhesive tape 71 is positioned near side (i. e., nearer to the user than the plurality of heat sensitive layers 42 is to the user).

Next, conveying passages of the heat sensitive tape 4 and the adhesive tape 7 will be described with reference to FIG. 3. The heat sensitive tape 4 is paid out frontward from a right end of the first supply roll 40 and is bent leftward at a position adjacent to a front right corner portion of the cassette case 31. The heat sensitive tape 4 passes through the inside of the arm portion 34 and is discharged out of the cassette case 31 through the opening portion 341.

In the head opening 391, the plurality of the heat sensitive layers 42 of the heat sensitive tape 4 (the upper surface of the heat sensitive tape 4) faces the thermal head 10, and the base layer 41 of the heat sensitive tape 4 (the lower surface of the heat sensitive tape 4) faces the platen roller 15. That is, in the attached state of the tape cassette 30 to the receiving portion 8, the thermal head 10 is positioned opposite to the base layer 41 with respect to the plurality of heat sensitive layers 42. In other words, the thermal head 10 is positioned rearward of the heat sensitive tape 4. Hence, in the head opening 391, the heat sensitive tape 4 is heated by the thermal head 10 from a side opposite to the base layer 41 (see printing direction Y2 in FIG. 5A).

Figure 5A:
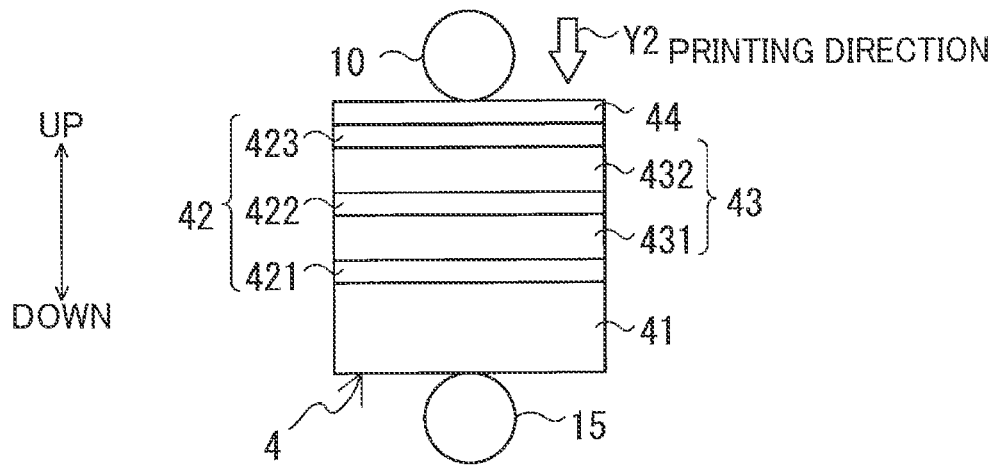
FIG. 5A is a schematic view for description one phase in the thermal printer 1.
Figure 5B:
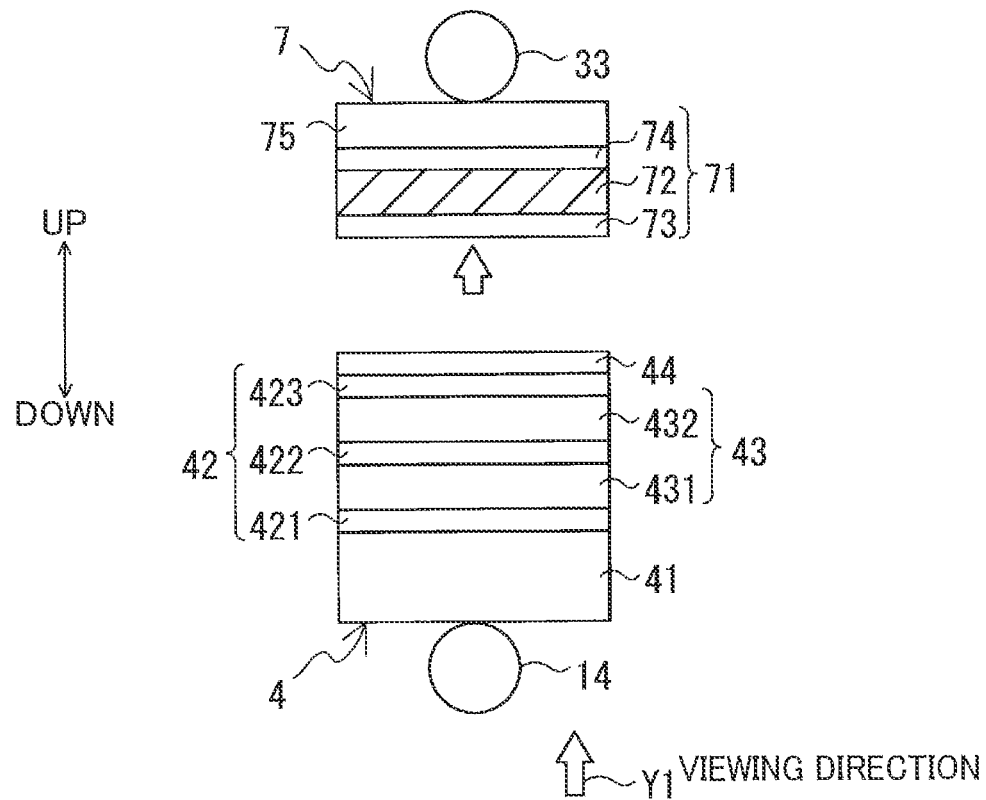
FIG. 5B is a schematic view for description of subsequent phase in the thermal printer.

As illustrated in FIG. 3, the heat sensitive tape 4 is moved through the head opening 391, and is moved through a portion between the conveyer roller 33 and the movable roller 14. At this time, as illustrated in FIG. 5B, the plurality of the heat sensitive layers 42 of the heat sensitive tape 4 faces the conveyer roller 33, and the base layer 41 of the heat sensitive layers 42 faces the movable roller 14.

The adhesive tape 7 is paid out frontward from a left end of the second supply roll 70. The adhesive tape 7 is the curved leftward along a front right part of the outer peripheral surface of the conveyer roller 33. At this time, the release sheet 75 of the adhesive tape 7 (the upper surface of the adhesive tape 7) faces the conveyer roller 33, and the double-sided adhesive tape 71 of the adhesive tape 7 (the lower surface of the adhesive tape 7) faces the movable roller 14. Accordingly, the conveyer roller 33 supports the adhesive tape 7 such that the heat sensitive tape 4 is positioned farther from the conveyer roller 33 than the adhesive tape 7 is from the conveyer roller 33 with a superposed state between the adhesive tape 7 and the heat sensitive tape 4 and the conveyer roller 33 is positioned opposite to the base layer 41 with respect to the plurality of heat sensitive layers 42.

The movable roller 14 is configured to stick the heat sensitive tape 4 and the adhesive tape 7 to each other by nipping the heat sensitive tape 4 and the adhesive tape 7 superposed with each other in cooperation with the conveyer roller 33. Hence, the tape 9 is produced. As illustrated in FIG. 3, the tape 9 passes through the guide portion 38 and is discharged out of the tape cassette 30. The tape 9 is then conveyed to the cutter mechanism 16 for cutting. The cut segment of the tape 9 is ejected out of the thermal printer 1 through the ejection slit formed in the housing 2.

Figure 6:
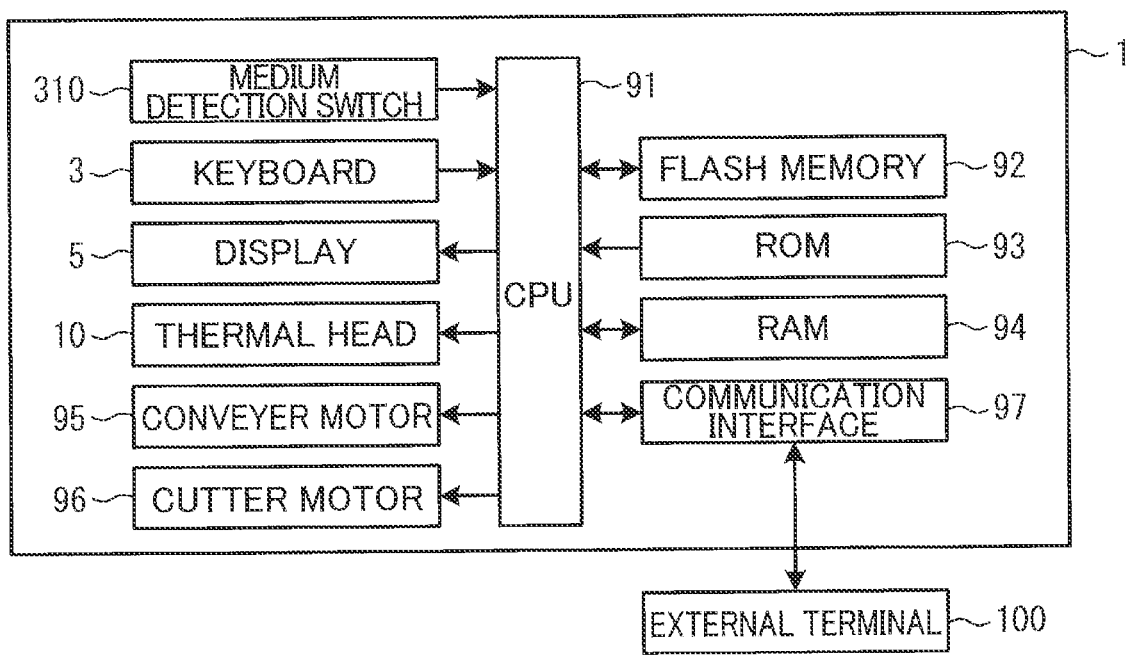
FIG. 6 is a block diagram illustrating an electrical construction in the thermal printer.

Electric connection structure in the thermal printer 1 will next be described with reference to FIG. 6. The thermal printer 1 includes a CPU 91 functioning as a processor for controlling the operation of thermal printer 1. A flash memory 92, a ROM 93, a RAM 94, a communication interface 97, the medium detection switch 310, the keyboard 3, the display 5, the thermal head 10, the conveyer motor 95, and the cutter motor 96 are electrically connected to the CPU 91.

The flash memory 92 is configured to store programs to be performed by the CPU 91, and information on cassette, and etc. The ROM 93 stores various parameters necessary for execution of the various programs. The RAM 94 is configured to store various temporary data including image data corresponding to each pixel area for original image to be printed, and print data produced on a basis of image data. The communication interface 97 is connected to an external terminal 100 for communication. Conventional USB interface, and a cable LAN or wireless LAN interface are available as the communication interface 97. For example, the CPU 91 may be configured to receive image data to be printed from the external terminal 100, and may permit the RAM 94 to store the image data. A personal computer (PC) of general purpose, a portable terminal, a memory card reader, and etc. are available as the external terminal 100.

Next, color development (chromogenic phenomenon) occurring in the heat sensitive layers 42 will be described. As described above, the first heat sensitive layer 421, the second heat sensitive layer 422, and the third heat sensitive layer 423 are configured to generate colors of cyan, magenta, and yellow, respectively, upon being heated to the temperatures equal to or higher than the first temperature, the second temperature and the third temperature, respectively.

The CPU 91 of the thermal printer 1 is configured to create printing data that sets electricity energization pattern for each dot to be formed in each heat sensitive layer 42 on a basis of an electricity energization pattern table (not illustrated) in a tape creation process (see FIG. 11) described later. The electricity energization pattern sets a energization timing at which the heat generating elements 11 is energized and energization period for energizing the heat generating element 11 in order to heat the heat sensitive layers 42 to the temperature for generating corresponding color of dot.

The heat generating elements 11 generates heat upon energization, and stops generating heat upon de-energization. In the printing operation, the third heat sensitive layer 423, the second heat sensitive layer 422, and the first heat sensitive layer 421 of the heat sensitive layers 42 are arrayed in this order so that the third heat sensitive layer 423 is closest to the heat generating elements 11, and the first heat sensitive layer 421 is farthest from the heat generating elements 11.

Each heat insulation layers 43 positioned between neighboring heat sensitive layers 42 has low thermal conductivity. Hence, when the heat generating elements 11 heats the heat sensitive layers 42, the third heat sensitive layer 423, the second heat sensitive layer 422, and the first heat sensitive layer 421 provide a temperature gradient such that the temperature of the third heat sensitive layer 423 is higher than that of the first heat sensitive layer 421.

Figure 7:
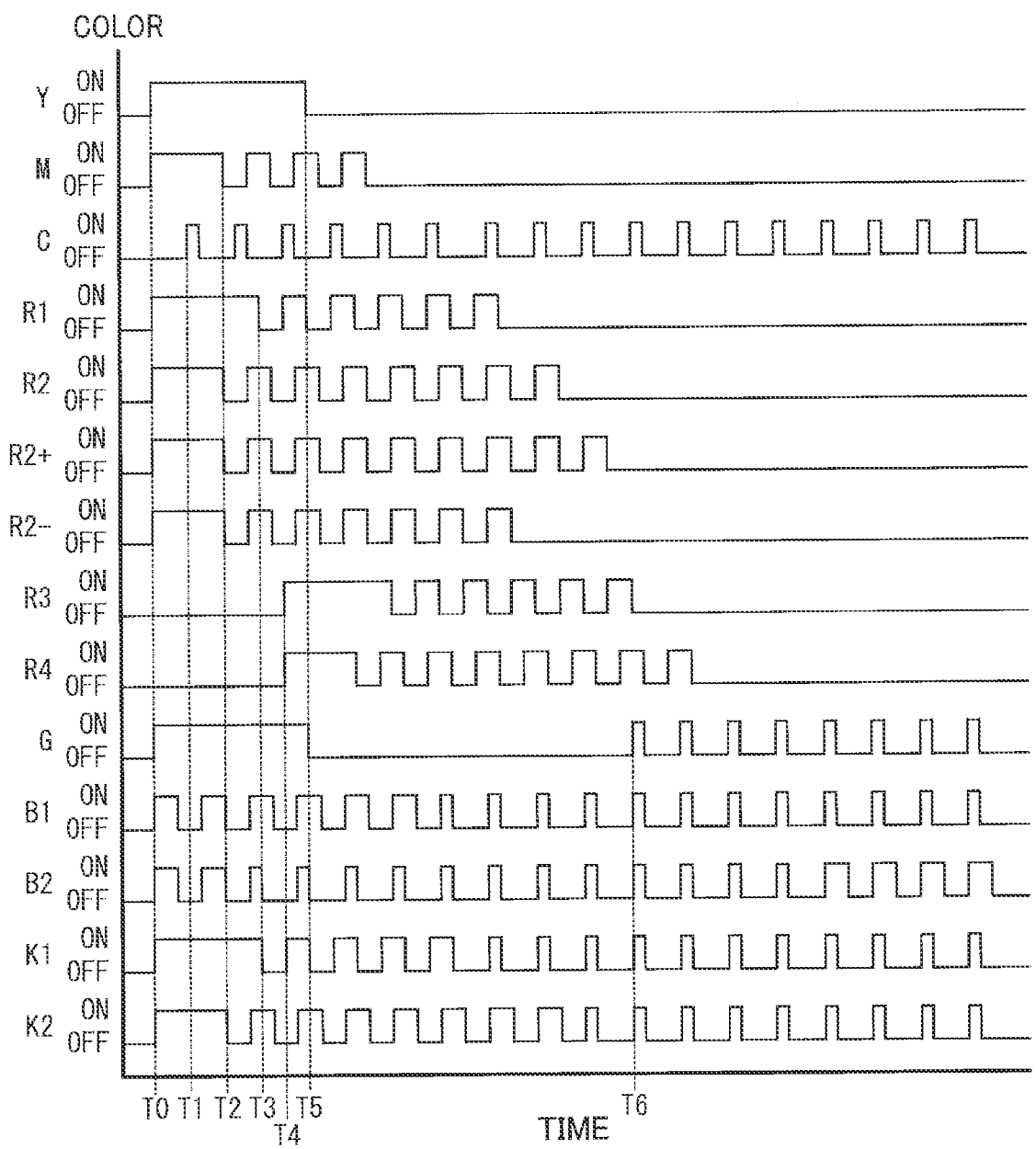
FIG. 7 is a timing chart illustrating electricity energization pattern of a heat generating element in the thermal printer.

The electricity energization pattern table is stored in the ROM 93, and shows the relationship among colors, energization timing, and energization period indicated in a timing chart of FIG. 7 as the electricity energization pattern. In the electricity energization pattern for the color of yellow (Y), energization state continues from energization start timing T0 (ON) to energization stop timing T5 (OFF).

Figure 8:
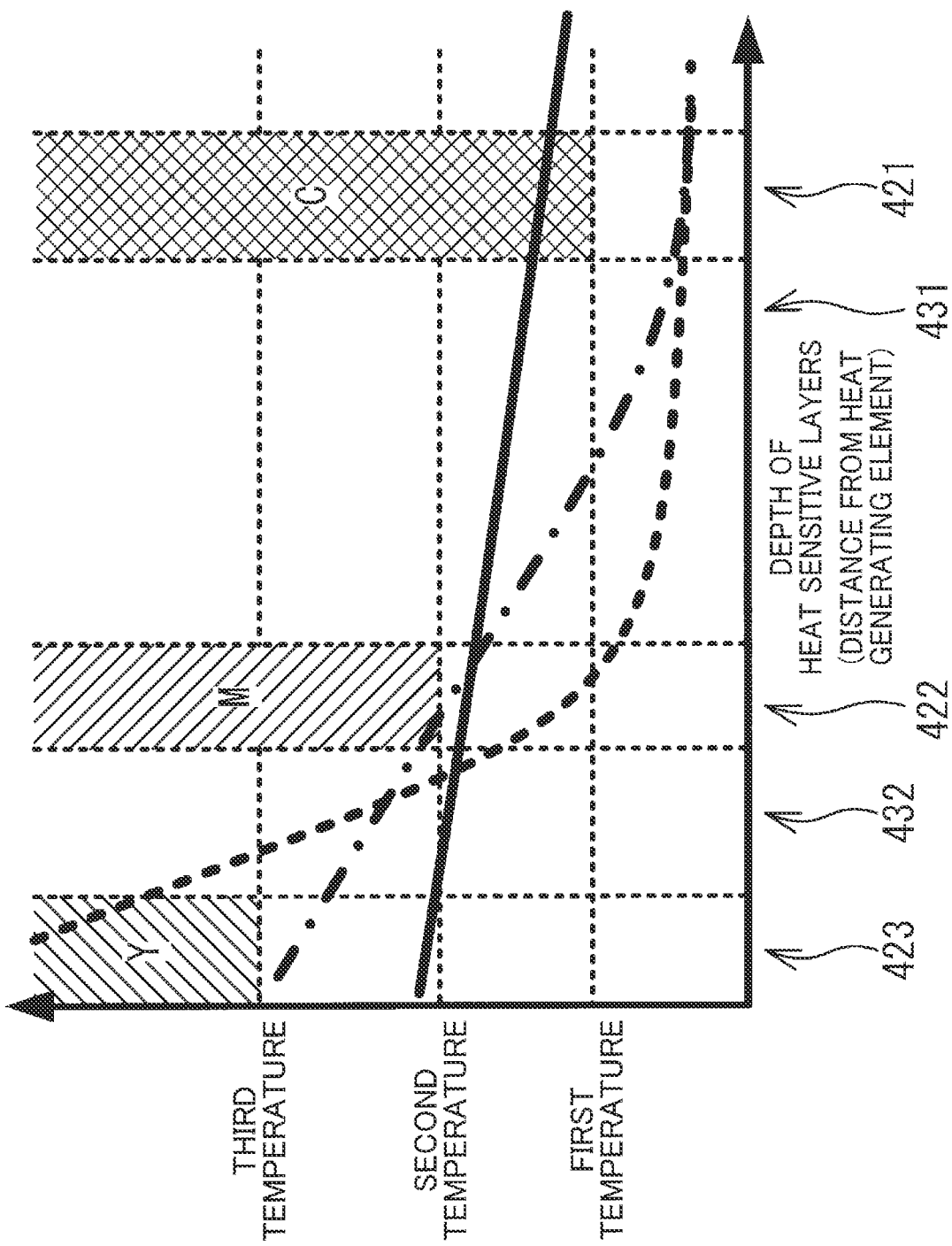
FIG. 8 is a graphical representation showing a relationship between a color developing temperature of each color and a depth of a heat sensitive layer.

A graph illustrated in FIG. 8 shows the relationship between the temperature and a depth of the heat sensitive layers 42. According to the graph, a shallow portion of the heat sensitive layers 42 is the third heat sensitive layer 423 positioned closest to the heat generating elements 11 among the heat sensitive layers 42. As indicated by a dotted line in the graph, the temperature of the shallow portion of the heat sensitive layers 42 becomes higher than the third temperature by the application of heat from the heat generating elements 11. Hence, development of yellow color occurs in the third heat sensitive layer 423.

Since heat released from the heat generating elements 11 is transmitted to the second heat sensitive layer 422 through the second heat insulation layer 432, temperature is lowered in accordance with an increase in depth. As indicated by the dotted line, since the temperature of the second heat sensitive layer 422 is lower than the second temperature, no color development occurs in the second heat sensitive layer 422.

The heat released from the heat generating elements 11 is further transmitted to the first heat sensitive layer 421 through the first heat insulation layer 431. As indicated by the dotted line, since the temperature of the first heat sensitive layer 421 is lower than the first temperature, no color development occurs in the first heat sensitive layer 421.

The temperature of the entire heat sensitive layers 42 is elevated if energization continues. However, energization is stopped at the timing T5 to prevent the second heat sensitive layer 422 from being heated to the temperature equal to or higher than the second temperature. Accordingly, only yellow color development in the third heat sensitive layer 423 occurs in accordance with the electricity energization pattern Y.

As illustrated in FIG. 7, in the electricity energization pattern for the color of magenta (M), energization is started at the start timing T0 and is stopped at a timing T2 before the timing T5, and then, energization having pulse span shorter than the duration of from T0 to T2 is repeated three times at regular intervals.

As indicated by a dotted chain line in the graph of FIG. 8, the temperature of the shallow portion of the heat sensitive layers 42 does not reach the temperature equal to or higher than the third temperature by the heat application in the duration of from T0 to T2. Therefore, yellow color is not developed in the third heat sensitive layer 423.

Then, by way of the repeated short span energizations, heat from the heat generating elements 11 is transmitted to an intermediate portion of the heat sensitive layers 42, i.e., the second heat sensitive layer 422. At this time, the temperature of the second heat sensitive layer 422 becomes lower than the third temperature and equal to or higher than the second temperature, and further, higher than the temperature associated with the electricity energization pattern Y indicated by the dotted line. Hence, the color of magenta is developed in the second heat sensitive layer 422.

The energization is terminated prior to heat transmission to the deep portion of the heat sensitive layers 42. The temperature of the first heat sensitive layer 421 is lower than the first temperature, and hence, no color development occurs in the first heat sensitive layer 421. Accordingly, only magenta color development in the second heat sensitive layer 422 occurs in accordance with the electricity energization pattern M.

As illustrated in FIG. 7, in the electricity energization pattern for the color of cyan (C), energization is started at a tinning T1 and totally 17 times energizations each having pulse span shorter than the repeated pulse span of the electricity energization pattern M is repeated at regular intervals. Each regular interval of the electricity energization pattern C is greater than each regular interval of the electricity energization pattern M.

As indicated by a solid line in the graph of FIG. 8, in accordance with the repeated energizations with the minimum pulse span shorter than the repeated pulse span of the electricity energization pattern M, the heat release from the heat generating elements 11 is transmitted from the shallow portion of the heat sensitive layers 42 to the entire portion of the heat sensitive layers 42 restraining the intermediate portion from excessive temperature elevation. Prior to termination of the repeated energizations, the temperature of the third heat sensitive layer 423 becomes equal or higher than the second temperature and lower than the third temperature, and temperatures of the second heat sensitive layer 422 and the first heat sensitive layer 421 become higher than the first temperature and lower than the second temperature. Accordingly, only cyan color development in the first heat sensitive layer 421 occurs in accordance with the electricity energization pattern C.

The heat sensitive layers 42 can provide a mixed color by the color developments occurring in at least two layers. The heat sensitive layers 42 provides red color (hereinafter simply referred to as "R") which is a mixed color of Y and M, green color (hereinafter simply referred to as "G") which is a mixed color of C and Y, blue color (hereinafter simply referred to as "B") which is a mixed color of C and M, and black color (hereinafter simply referred to as "K") which is a mixed color of C, M and Y.

As illustrated in FIG. 7, in the electricity energization pattern for the color of red (R1), initial energization is started from the timing T0 to T3. The pulse span of the initial energization is greater than the pulse span of the initial energization in the electricity energization pattern M starting from T0 and ending at T2.

Figure 9:
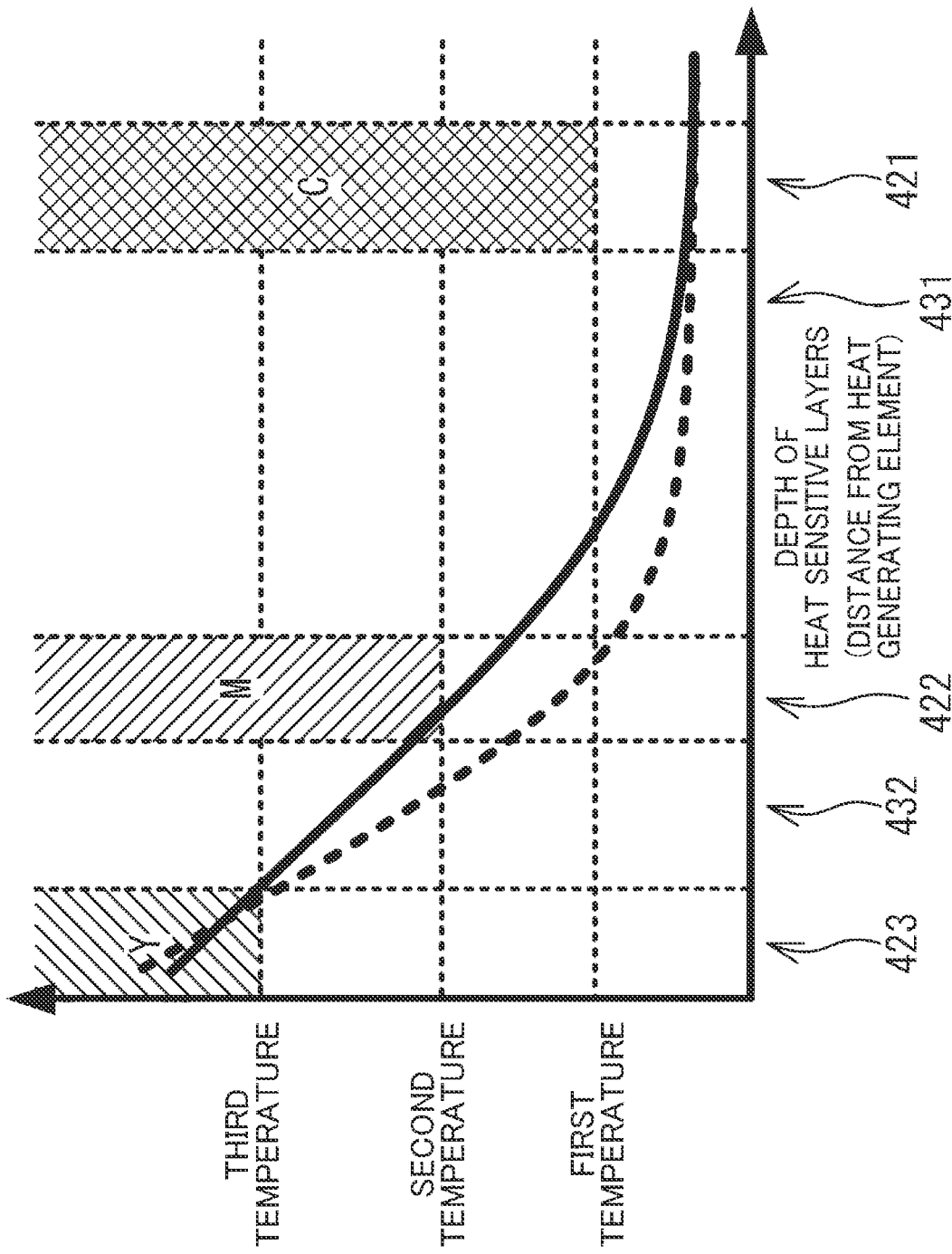
FIG. 9 is a graphical representation showing a relationship between the color developing temperature and the depth of the heat sensitive layer in case of electricity energization pattern of red R1.

As indicated by a dotted line in a graph of FIG. 9, at an initial energization stage, the shallow portion of the heat sensitive layers 42 provides temperature elevation lower than that in the electricity energization pattern Y indicated by the dotted line in FIG. 8, but Higher than the temperature elevation in the electricity energization pattern M indicated by the dotted chain line in FIG. 8. The temperature of the third heat sensitive layer 423 becomes equal to or higher than the third temperature, so that yellow color development occurs in the third heat sensitive layer 423.

Then, energization having short pulse span equal to the repeated pulse span in the electricity energization pattern M is repeated five times at regular intervals (see FIG. 7). Hence, temperature of the intermediate portion and the deep portion of the heat sensitive layers 42 is gradually elevated as indicated by the solid line in FIG. 9. Accordingly, the temperature of the second heat sensitive layer 422 becomes equal to or higher than the second temperature, and lower than the third temperature, so that magenta color development occurs in the second heat sensitive layer 422.

The energization is terminated before temperature elevation of the deep portion of the heat sensitive layer 42. Hence, the temperature of the first heat sensitive layer 421 is maintained at a temperature lower than the first temperature avoiding color development in the first heat sensitive layer 421. As such, yellow color development occurs in the third heat sensitive layer 423, and then, magenta color development occurs in the second heat sensitive layer 422 to provide a resultant color of red (R1) as a mixed color.

In the electricity energization pattern for the color of red (R2) illustrated in FIG. 7, order of yellow color development and the magenta color development with respect to the heat sensitive layers 42 is set to be opposite to the order in the electricity energization pattern R1. According to the electricity energization pattern R2, initial energization is started at the timing T0 and is stopped at the timing T2 similar to the electricity energization pattern M1. Thereafter, energizations each having short pulse span is repeated seven times at regular intervals.

Figure 10:
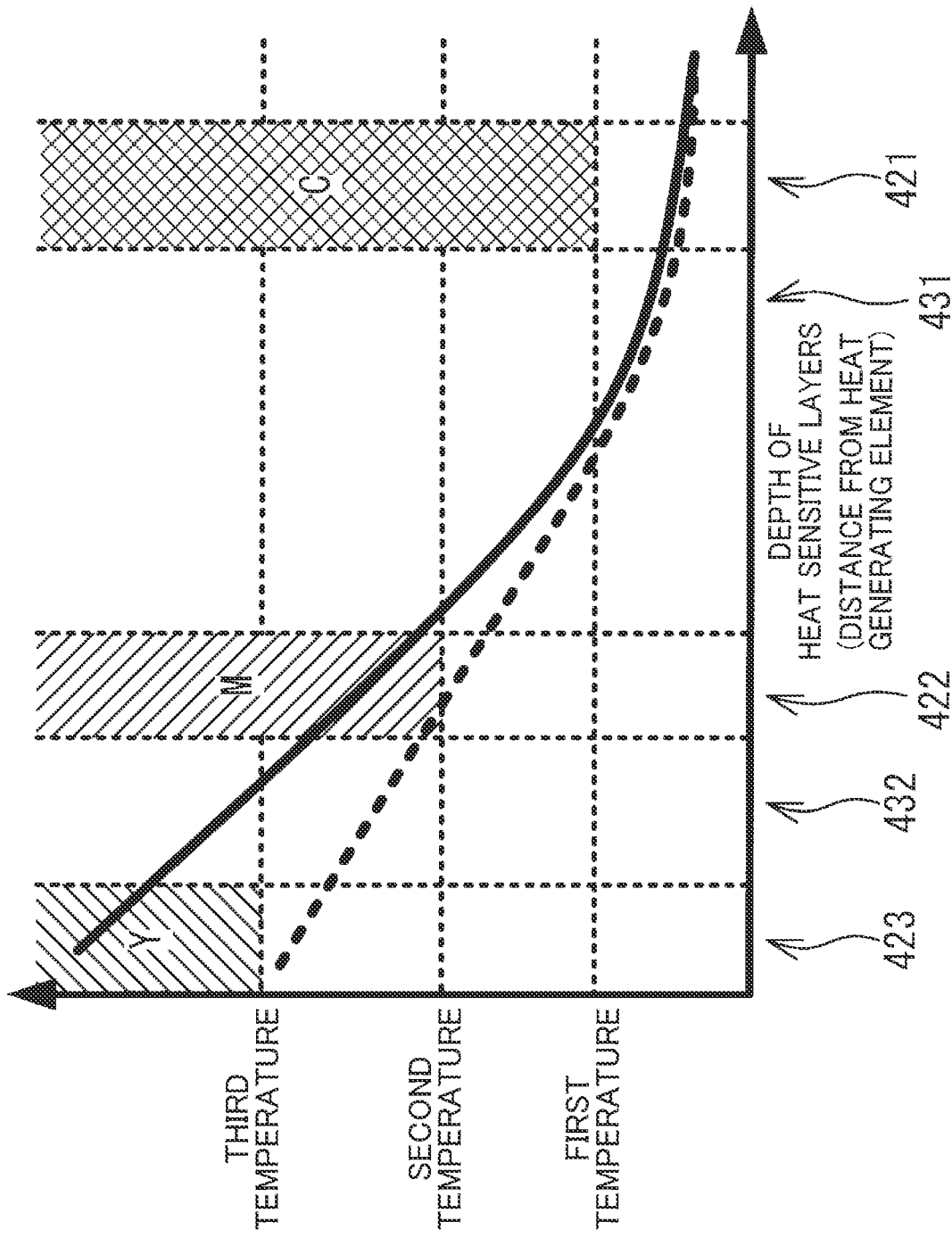
FIG. 10 is a graphical representation showing a relationship between the color developing temperature and the depth of the heat sensitive layer in case of electricity energization pattern of red R2.

As indicated by a dotted line in a graph of FIG. 10, after the short pulse span energization is performed three times, the temperature gradient of the entire heat sensitive layers 42 becomes the same as that provided in the electricity energization pattern M as indicted by the dotted chain line in FIG. 8. At this time, magenta color development occurs in the second heat sensitive layer 422.

Since short pulse span energizations continue subsequently, temperature of the intermediate portion and the deep portion of the heat sensitive layers 42 is gradually elevated as indicated by a solid line in FIG. 10. Hence, the temperature of the third heat sensitive layer 423 becomes higher than the third temperature so that yellow color development occurs in the third heat sensitive layer 423. Energization is terminated prior to increase in temperature of the deep portion of the heat sensitive layers 42. Hence, the temperature of the first heat sensitive layer 421 is maintained to be lower than the first temperature, so that no color development occurs in the first heat sensitive layer 421. As such, magenta color development occurs in the second heat sensitive layer 422, and then, yellow color development occurs in the third heat sensitive layer 423 to provide a resultant color of red (R2) as a mixed color.

Electricity energization pattern for the color of red (R2+) is the same as electricity energization pattern for the color of R2 except that the number of the short pulse span energizations in electricity energization pattern R2+ is greater that of the of the electricity energization pattern R2 by one time. Since the period for heating the third heat sensitive layer 423 to the temperature higher than the third temperature is increased in the electricity energization pattern R2+, coloring area of the yellow dots can be enlarged.

Similarly, electricity energization pattern for the color of red (R2−) is the same as electricity energization pattern for the color of R2 except that the number of the short pulse span energizations in electricity energization pattern R2− is smaller that of the of the electricity energization pattern R2 by one time, Since the period for heating the third heat sensitive layer 423 to the temperature higher than the third temperature is decreased in the electricity energization pattern R2+, coloring area of the yellow dots can be decreased. Incidentally, coloring area of the yellow dots can be increased or decreased by increasing or decreasing a length of pulse span of the short pulse span energizations in electricity energization pattern R2.

The electricity energization pattern for the color of red (R3) illustrated in FIG. 7 is the same as electricity energization pattern R1 except that the start timing of the initial energization is delayed from the timing T0 to a timing T4. Further, the electricity energization pattern for the color of red (R4) illustrated in FIG. 7 is the same as electricity energization pattern R2 except that the start timing of the initial energization is delayed from the timing T0 to a timing T4.

In the thermal printer 1, dot is formed in the heat sensitive layers 42 by energizing the heat generating elements 11 while the heat sensitive tape 4 is conveyed. Positions of the dots are displaced toward upstream side of the heat sensitive tape 4 in the tape conveying direction under the electricity energization pattern R3 or R4 because of the conveyance of the heat sensitive tape 4 during the time period from T0 to T4. Because of the positional displacement between the R3 dots or R4 dots and dots formed ambient thereto, color tone of the resultant dots formed under electricity energization pattern R3 or R4 is different from the color tone of the resultant dots formed under electricity energization pattern R1 or R2.

According to the electricity energization pattern for the color of green (G) illustrated in FIG. 7, an initial energization is started at the timing T0 and is stopped at the timing T5 similar to the electricity energization pattern Y. Hence, yellow color development occurs in the third heat sensitive layer 423. Then, the heat generating elements 11 is not energized until a timing T6. Here, a time span from the timing T5 to the timing T6 is greater than the time span from the timing T0 to the timing T5.

The temperature of the shallow portion of the heat sensitive layers 42 is lowered during the time span from the timing T5 to the timing T6, whereas the temperature of the intermediate portion and deep portion of the heat sensitive layers 42 elevated due to heat transmission during the time span from the timing T5 to the timing T6.

Then, energization having short pulse span is started at the timing T6 and is repeated by eight times at regular intervals. Here, each pulse length of the short pulse is equal to that in the electricity energization pattern C. The temperature gradient of the entire heat sensitive layers 42 becomes substantially similar to that provided by the electricity energization pattern C indicated by solid line in FIG. 8.

Before termination of the repeated energizations each having short pulse span, the temperature of the third heat sensitive layer 423 becomes equal to or higher than the second temperature and lower than the third temperature, and the temperature of the second heat sensitive layer 422 and the first heat sensitive layer 421 becomes higher than the first temperature and lower than the second temperature. Hence, cyan color is developed in the first heat sensitive layer 421. As such, yellow color development occurs in the third heat sensitive layer 423, and cyan color development occurs in the first heat sensitive layer 421 to provide the resultant color of green (G) as a mixed color.

According to the electricity energization pattern for the color of blue (B1) illustrated in FIG. 7, an initial energization having short pulse span the same as the short pulse spun in the electricity energization pattern M is started at the timing T0 and is repeated six times. Temperature of the entire heat sensitive layers 42 is elevated restraining the shallow portion of the heat sensitive layers 42 from abrupt temperature elevation. Hence, color of magenta is developed in the second heat sensitive layer 422.

After the repeated energization with the short pulse span, energization with extremely short pulse span is repeated twelve times. Temperature of the entire heat sensitive layers 42 is elevated further restraining the shallow portion of the heat sensitive layers 42 from abrupt temperature elevation. Hence, color of magenta is developed in the second heat sensitive layer 422. Although not illustrated, temperature gradient provided by the electricity energization pattern B1 is the same as that provided by the electricity energization pattern C as indicated by the solid line in FIG. 8, except that the temperature gradient in its entirety is shifted to higher temperature.

Before termination of the repeated energization with the extremely short pulse span, the temperature of the second heat sensitive layer 422 and the third heat sensitive layer 423 becomes equal to or higher than the second temperature and lower than the third temperature, and the temperature of the first heat sensitive layer 421 becomes equal to or higher than the first temperature. Hence, color of cyan is developed in the first heat sensitive layer 421. As such, magenta color development occurs in the second heat sensitive layer 422, and then cyan color development occurs in the first heat sensitive layer 421 to provide the resultant color of blue (B1) as a mixed color.

According to the electricity energization pattern for the color of blue (B2) illustrated in FIG. 7, energization having short pulse span is started at the timing T0 and is repeated twice at a regular interval. Thereafter, energization having extremely short pulse span is repeated twelve times at regular intervals. The temperature of the entire heat sensitive layers 42 is elevated further restraining the shallow portion of the heat sensitive layers 42 from temperature elevation.

Although not illustrated, temperature gradient provided by the electricity energization pattern B2 is the same as that provided by the electricity energization pattern C as indicated by the solid line in FIG. 8, except that the temperature is gradually elevated with the lapse of time in the electricity energization pattern B2. Hence, the temperature of the first heat sensitive layer 421 becomes equal to or higher than the first temperature while the temperature of the second heat sensitive layer 422 remains lower than the second temperature. Hence, the color of cyan is developed in the first heat sensitive layer 421.

After twelve times energizations with the extremely short pulse span, energizations with short pulse span is repeated four times at regular intervals. Hence, the temperature of the heat sensitive layers 42, particularly the shallow portion and the intermediate portion thereof is elevated. Before termination of the four times energizations, the temperature of the second heat sensitive layer 422 becomes equal to or higher than the second temperature and lower than the third temperature, while the temperature of the third heat sensitive layer 423 remains lower than the third temperature. Hence, the color of magenta is developed in the second heat sensitive layer 422. As such, cyan color development occurs in the first heat sensitive layer 42, and then magenta color development occurs in the second heat sensitive layer 422 to provide the resultant color of blue (B2) as a mixed color.

According to the electricity energization pattern for the color of black (B1) illustrated in FIG. 7, energization having long pulse span the same as the pulse span in the electricity energization pattern R1 is started at the timing T0 and is stopped at the timing T3. Then, energization having short pulse span is repeated four times at regular intervals, and thereafter, energization having extremely short pulse span is repeated eleven times at regular intervals.

Hence, similar to the electricity energization pattern R1, the color of yellow is developed in the third heat sensitive layer 423 as indicated by the broken line in FIG. 9, and then, the color of magenta is developed in the second heat sensitive layer 422 as indicated by the solid line in FIG. 9. Further, because of the repeated energization with the extremely short pulse span, the temperature of the entire heat sensitive layers 42 is elevated to develop cyan in the first heat sensitive layer 421. As such, the colors of yellow, magenta, and cyan are developed in this order to provide the resultant color of black (B1) as a mixed color.

According to the electricity energization pattern for the color of black (B2) illustrated in FIG. 7, energization having long pulse span the same as the pulse span in the electricity energization pattern R2 is started at the timing T0 and is stopped at the timing T2. Then, energization having short pulse span is repeated seven times at regular intervals, and thereafter, energization having extremely short pulse span is repeated nine times at regular intervals.

Hence, similar to the electricity energization pattern R2, the color of magenta is developed in the second heat sensitive layer 422 as indicated by the broken line in FIG. 10, and then, the color of yellow is developed in the third heat sensitive layer 423 as indicated by the solid line in FIG. 10. Further, because of the repeated energization with the extremely short pulse span, the temperature of the entire heat sensitive layers 42 is elevated to develop cyan in the first heat sensitive layer 421. As such, the colors of magenta, yellow, and cyan are developed in this order to provide the resultant color of black (B2) as a mixed color.

Various electricity energization patterns other than the above electricity energization patterns are conceivable. For example, electricity energization pattern for the color of black may permit the first heat sensitive layer 421 to develop cyan color prior to the color development of yellow and magenta. Further, electricity energization patterns in which energization start timing is later than the tuning T0 may be conceivable in addition to the electricity energization patterns R3 and R4.

Next, an outline of the tape creation process performed by the thermal printer 1 will be described. As described above, the thermal printer 1 can use various types of the tape cassettes such as receptor type, laminate type and etc. The receptor type cassette uses a heat sensitive tape the same as the heat sensitive tape 4 of the laminate type including a base layer and heat sensitive layers formed on one surface of the base layer. A release sheet is stuck to another surface of the base layer through an adhesive layer. In case of the tape of the receptor type, a user observes the image formed in the heat sensitive layers in a direction from the heat sensitive layers toward the release sheet. This viewing direction is the same as the printing direction Y2 of the laminate type tape illustrated in FIG. 5A.

Heat applied to the heat sensitive tape 4 by the heat source (heat generating element 11) is dissipated with increasing the distance from the heat generating element 11 (with increasing the depth of the heat sensitive layers 42). Therefore, color development range is likely to be smaller in the order of from the third heat sensitive layer 423, the second heat sensitive layer 422, and the first heat sensitive layer 421. That is, since the third heat sensitive layer 423 is positioned closest to the heat generating element 11 among the three heat sensitive layers, the color developing region is likely to be greater than that of the second heat sensitive layer 422 whose color developing region is likely to be greater than that of the first heat sensitive layer 421.

Further, in case of formation of red dot in the tape of the receptor type under the electricity energization pattern R1, yellow color is developed in the third heat sensitive layer 423, and then, magenta color is developed in the second heat sensitive layer 422 when the temperature of the second heat sensitive layer 422 becomes equal to or higher than the second temperature while the temperature of the third heat sensitive layer 423 remains higher than the third temperature. Therefore, a heating time period for the yellow dot is longer than the heating time period for the magenta dot. Accordingly, the yellow dot has a dot size greater than that of the magenta dot.

When viewing the red dot (mixed color of yellow and magenta) in the printing direction Y2, an outline of the magenta dot may be blurred because the large yellow dot is positioned above the small magenta dot, so that entirely uniform red dot can be observed in the tape of the receptor type.

On the other hand, in case of the tape 9 of the laminate type, the user observes the image in the direction from the base layer 41 to the adhesive tape 7, i.e., in the viewing direction Y1 as indicated in FIG. 5B. Since the small magenta dot is positioned near side than the large yellow dot, clear outline of the magenta dot can be observed by the user, so that the user recognizes a red dot whose outline is surrounded by a yellow ring.

Taking the above into consideration, in case of performing printing on the heat sensitive tape 4 of the laminate type whose visual direction is Y1, the electricity energization pattern R2 is selected in the thermal printer 1 for forming red dot. According to the electricity energization pattern R2, after the magenta color is developed in the second heat sensitive layer 422, the yellow color is developed in the third heat sensitive layer 423 when the temperature of the third heat sensitive layer 423 becomes equal to or higher than the third temperature while the temperature of the second heat sensitive layer 422 remains higher than the second temperature. Therefore, a heating time period for the magenta dot is longer than the heating time period for the yellow dot. Accordingly, the magenta dot has a dot size greater than that of the yellow dot.

When viewing the red dot in the viewing direction Y1, an outline of the yellow dot may be blurred because the large magenta dot is positioned near side than the small yellow dot in the viewing direction Y1, so that entirely uniform red dot can be observed in the tape of the laminated type.

In this way, the color tone of the red dot formed by the electricity energization pattern R1 and observed in the printing direction Y2 is visually recognized, by the user, to be similar to the color tone of the red dot formed by the electricity energization pattern R2 and observed in the printing direction Y1. Hence, according to the tape creation process described later, electricity energization pattern is set for the dot formation dependent on the user's viewing direction to the created tape.

Further, in the heat sensitive tape 4 of laminate type, the base layer 41 has visible light transmittance as described above. In case of observation to the red dot formed under electricity energization pattern R1 in a direction slightly inclined with respect to the viewing direction Y1, a part of the yellow dot positioned around the outline of the magenta dot is observed to be greater than the original size under the influence of refractive index of the base layer 41, thickness of the base layer 41, and a ratio of thickness of the base layer 41 to the heat sensitive tape 4.

Therefore, in case of observation in the direction slightly inclined with respect to the viewing direction Y1, the thermal printer 1 forms red dot under the electricity energization pattern R2 for user's visual recognition to the red dot in a state where magenta dot is positioned near side than the yellow dot and the yellow dot is positioned within the magenta dot. Accordingly outline of the yellow dot is blurred, and hence, a part of the magenta dot positioned outside of the yellow dot is unlikely to be prominent even though resultant red dot is observed to be greater than its original size.

Next, tape creation process in the thermal printer 1 will be described. The user inputs printing start instruction by operating the keyboard 3. The CPU 91 reads programs from the flash memory 92 upon acquisition of the printing start instruction to start tape creation process. In the tape creation process, printing operation performed in the thermal printer 1 is controlled to create the tape 9.

As illustrated in a flowchart of FIG. 11, the CPU 91 acquires image data representing an image instructed by the user (S1). The image data is created by execution of editing program through user's operation to the keyboard 3, and is stored in the flash memory 92. The user specifies in advance the image to be formed in the tape 9 through the operation to the keyboard 3. The image to be formed in the tape 9 is the image that is visible when the user observes the tape 9 in the viewing direction Y1. Incidentally, the image data may be read in advance from the external terminal 100 and stored in the flash memory 92.

Then the CPU 91 acquires viewing direction (S2). As described above, in the medium indicating portion 900 of the tape cassette 30, numbers and positions of the bores are set in advance depending on the kind of the tape 9 accommodated in the tape cassette 30. The CPU 91 acquires kinds of the tape 9 by way of the detection by the medium detection switch 310 with reference to cassette information stored in the flash memory 92 (S2). Incidentally, the cassette information is a table indicating the relationship between the pattern of the medium indicating portion 900 and the kinds of the tape 9.

The kinds of the tape is represented by information on viewing direction, relevant information on thickness, and relevant information on refractive index. The information on viewing direction is indicative of the tape such as the tape of laminate type to be observed by the user in the viewing direction Y1, or the tape such as the tape of receptor type to be observed by the user in the printing direction Y2.

The relevant information on thickness indicates the thickness of the base layer 41. The relevant information on thickness may be on a basis of an actual size of the base layer 41, or may be classified information such as "large" "intermediate" and "small" those depending on the kinds classified in electricity energization pattern table. Alternatively, the relevant information on thickness may be a represented by a thickness ratio of the base layer 41 to the heat sensitive tape 4 or to each heat sensitive layer constituting the heat sensitive tape 4.

The relevant information on refractive index indicates the refractive index of the base layer 41. The relevant information on refractive index may be on a basis of actual measurement value, or may be classified information such as "high", "intermediate" and "low" those depending on the kinds classified in the electricity energization pattern table. Alternatively, this information may indicate a kind (material) of the base layer 41.

In a case where the tape 9 is of the type to be observed in the printing direction Y2 (S3; No), the routine proceeds to step S11. On the other hand, in a case where the tape 9 is of the type to be observed in the viewing direction Y1 (S3: Yes), the CPU 91 creates new image data indicative of a mirrored image by mirror image inversion to the original image data (S4). According to the mirror image inversion, an image content on the heat sensitive tape 4 as viewed from the printing direction Y2 is symmetrically moved with respect to a symmetrical axis extending in a direction parallel to the longitudinal direction of the heat sensitive tape 4 and passing through a center in short direction of the heat sensitive tape 4. Then, the routine proceeds to the step S11.

In the step S11, the CPU 91 performs printing color conversion processing. According to the printing color conversion processing, a color of each pixel of the image data is converted into a color of dot to be developed by the thermal printer 1. The thermal printer 1 permits each heat sensitive layer 42 to develop respective colors of cyan, magenta, yellow, and permits the heat sensitive layers 42 to represent colors of red, green, blue, and black as mixed colors. The CPU 91 performs color separation with respect to each color of each pixel contained in the image data to perform color conversion for the color representation by the above-described colors.

Then, the CPU 91 acquires various parameters governing color development of the heat sensitive layers 42 (S12). Ambient temperature and temperature of the thermal head 10 are examples of the parameters. The CPU 91 corrects electricity energization pattern depending on the parameters when creating command for controlling the energization to the heat generating elements 11. Further, the CPU 91 acquires, from the cassette information, information on thickness, the thickness ratio, and refractive index of the base layer 41 as the parameters in a case where the kind of the tape 9 acquired in the step S2 belongs to the laminate type.

The CPU 91 determines electricity energization pattern of each dot subjected to color conversion in S11 on a basis of the electricity energization pattern table (not illustrated). Incidentally, according to the present embodiment, electricity energization patterns R1, B1, K1 are applied for the tape of receptor type, and electricity energization patterns R2, B2, K2 are applied for the tape of laminate type for simplifications of the description. Further, in case of the tape of laminate type, the electricity energization pattern R4 is applied in a case where the thickness, the ratio of the thickness, and the refractive index of the base layer 41 are greater than the predetermined values set in advance on the basis of the information on the thickness, the ratio of the thickness, and the refractive index of the base layer 41 those acquired in S12.

Incidentally, the electricity energization pattern may be based on at least one of the information on the thickness, the ratio, and the refractive index. Alternatively, the electricity energization pattern may be based on a combination of at least two information on the thickness, the ratio, and the refractive index. For example, the electricity energization patter R4 may be applied in a case where the thickness of the base layer 41 is greater than the predetermined value or the refractive index of the base layer 41 is higher than the predetermined value, and the electricity energization pattern R2 may be applied in a case where the thickness of the base layer 41 is equal to or smaller than the predetermined value, and the refractive index of the base layer 41 is equal to or lower than the predetermined value.

Further, the CPU 91 may use modified electricity energization patterns R2+, R2−, R2 (not illustrated) in which the pulse length of each of the repeated pulses having short pulse span may be increased or decreased depending on the parameters to alter the coloring area of the dot, to thus restrain color drift.

Then, the CPU 91 creates print data (S14). That is, the CPU 91 creates, in accordance with a prescribed format, command for controlling energization of each heat generating element 11 corresponding to each dot on a basis of the electricity energization pattern of each dot and the parameters acquired in S12.

The CPU 91 outputs the print data to perform printing process executed by other printing program to form an image on the tape 9. According to the other program, the CPU 91 controls the conveyer motor 95 to rotate the drive shaft 18. Hence, the heat sensitive tape 4 is paid out from the first supply roll 40 and the adhesive tape 7 is paid out from the second supply roll 70 by the cooperation of the conveyer roller 33 and the movable roller 14.

The CPU 91 controls the thermal head 10 while controlling the conveyer motor 95. Specifically, the CPU 91 executes each command of the print data to permit selected heat generating element(s) 11 to generate heat while conveying the heat sensitive tape 4. The plurality of the heat sensitive layers 42 of the heat sensitive tape 4 is heated by the thermal head 10 such that one surface of the heat sensitive layers 42 opposite to the base layer 41 is heated. Hence, color development occurs to form dot(s) in the heat sensitive layers 42, generating on the heat sensitive tape 4 a visible image on the basis of the image data (S21).

In the process of conveying the tape 9, the adhesive tape 7 is stuck, at a position between the conveyer roller 33 and the movable roller 14, to the surface of the heat sensitive tape 4, the surface being opposite to the base layer 41 with respect to the plurality of heat sensitive layers 42. Hence, the tape 9 is created. Then, the CPU 91 controls the cutter motor 96 for permitting the cutter mechanism 16 to cut the tape 9 (S22). As a result, the CPU 91 terminates the tape creation process.

As described above, the CPU 91 can create print data capable of changing color developing state of the resultant image depending on the viewing direction by the application of selected electricity energization patterns depending on the viewing direction for the formation of the image on the heat sensitive layers 42. Hence, the thermal printer 1 can form the image on the heat sensitive layers 42 such that the color tone of the image when viewing the heat sensitive layers 42 in the direction from the base layer 41 to the heat sensitive layers 42 through the base layer 41 and the color tone of the image when directly viewing the heat sensitive layers 42 in the direction opposite to the above-described direction are approximately equal to each other. That is, according to the thermal printer 1 color tone of the resultant image can be approximated regardless of the viewing direction.

In the color image formed by superposing colors of at least two heat sensitive layers 42 with each other, color tone of the resultant image is likely to be changed dependent on the change in viewing direction to the image. According to the present embodiment, electricity energization patterns capable of approximating the color tone of the resultant image regardless of the change in viewing direction are provided, for example, the electricity energization pattern R1 versus the electricity energization pattern R2. The CPU 91 can create print data employing the electricity energization pattern matching the result of detection of the viewing direction. Hence, the thermal printer 1 can approximate the color tone of the resultant image formed in the heat sensitive tape 4 and observed through the base layer 41 such as the image on the laminate type tape to the color tone of the resultant image formed in the heat sensitive tape 4 and directly observed without the base layer 41 such as the image on the receptor type tape.

In the color image formed by superposing colors of at least two heat sensitive layers 42 with each other, images formed in the at least two heat sensitive layers 42 may be visually displaced from each other due to the effect of the thickness and refractive index of the base layer 41, so that resultant color of the superposed images may be visually varied. According to the embodiment, plurality of electricity energization patterns are prepared for developing identical color such as electricity energization pattern R2 and electricity energization pattern R4 such that timing of the electricity energizations to the heat generating elements 11 are different from each other. The CPU 91 can create print data using the electricity energization pattern in conformance with the result of detection of the viewing direction. Hence, the thermal printer 1 can approximate the color tone of the resultant image formed in the heat sensitive tape 4 and observed through the base layer 41 such as the image on the laminate type tape to the color tone of the resultant image formed in the heat sensitive tape 4 and directly observed without the base layer 41 such as the image on the receptor type tape.

In the color image formed by superposing colors of at least two heat sensitive layers 42 with each other, color tone may be varied due to the effect of the thickness of the base layer 41. The CPU 91 can create print data capable of differentiating color development state depending on the information on the thickness of the base layer 41 acquired on the basis of the kind of tape. Hence, the thermal printer 1 can approximate the color tone of the resultant image funned in the heat sensitive tape 4 and observed through the base layer 41 such as the image on the laminate type tape to the color tone of the resultant image formed in the heat sensitive tape 4 and directly observed without the base layer 41 such as the image on the receptor type tape.

In the color image formed by superposing colors of at least two heat sensitive layers 42 with each other, position of the images formed in the heat sensitive layers may be displaced from each other due to the effect of refractive index of the base layer 41, which may cause change in color tone. The CPU 91 can create print data capable of differentiating color development state depending on the information on the refractive index of the base layer 41 acquired on the basis of the kind of tape. Hence, the thermal printer 1 can approximate the color tone of the resultant image formed in the heat sensitive tape 4 and Observed through the base layer 41 such as the image on the laminate type tape to the color tone of the resultant image formed in the heat sensitive tape 4 and directly observed without the base layer 41 such as the image on the receptor type tape.

In order to form images on each of at least two heat sensitive layers 42, the CPU 91 can create print data in which electricity energization pattern to the heat generating element 11 is controlled dependent on the heat sensitive layer 42. That is, in the thermal printer 1, magnitude and order of energy to be applied to the heat sensitive layers 42 are altered by altering, the electricity energization pattern for developing color in each heat sensitive layer 42, to thus control a size of color development (size of a dot), thereby reducing occurrence of fringe and overlapping color irregularities.

In the image formed in the heat sensitive tape 4, the shallower the depth of the heat sensitive layers 42, the greater the size of color development (dot size). That is, the dot size of the third heat sensitive layer 423 is the largest, and the dot size of the first heat sensitive layer 421 is the smallest. In a case where the image is observed in the direction from the base layer 41, the color tone is likely to be changed, since the dot size formed in the near side is smaller than the dot size formed in the far side.

According to the present embodiment, the CPU 91 can create print data capable of controlling timing of applying energy to each of the heat sensitive layers 42. Hence, the thermal printer 1 can permit each of the heat sensitive layers 42 to develop color at timing different from each other. The thermal printer 1 controls the size of the color development (dot size) for each of the heat sensitive layers 42 to reduce occurrence of fringe or chromatic aberration and overlapping color irregularities.

The CPU 91 employs various electricity energization patterns R2, B2, K2 instead of R1, B1, K1 whereby order of the color development occurring in each of the plurality of heat sensitive layers 42 can be changed. Specifically. The CPU 91 may employ various electricity energization patterns R2, B2, K2 instead of R1, B1, K1 whereby color developing timing of each of the heat sensitive layers 42 is replaced with another color developing timing of another one of the heat sensitive layers 42. Hence, the CPU 91 can easily create the print data capable of differentiating color development timing of each heat sensitive layer 42. Accordingly, the thermal printer 1 can permit the heat sensitive layers 42 to develop colors with different order of color development. Consequently, the thermal printer 1 can control the size of the color development for each of the heat sensitive layers 42 to reduce occurrence of fringe and overlapping color irregularities.

The CPU 91 can create print data capable of making the color developing area of at least one heat sensitive layer 42 to be different from the color developing area of the other heat sensitive layers 42 by employing electricity energization patterns R2+ and R2−. Specifically, the CPU 91 can create print data capable of making the color developing area of the far side heat sensitive layer 42 to be relatively greater than the color developing area of the near side heat sensitive layer 42. Hence, the thermal printer 1 can control the size of the color development for each of the heat sensitive layers 42 to reduce occurrence of fringe and overlapping color irregularities.

The CPU 91 according to the present embodiment creates, with respect to the heat sensitive tape 4 including three heat sensitive layers 42, print data capable of providing equivalent color tone between the color tone of the image formed in the heat sensitive layers 42 and observed through the base layer 41 of the heat sensitive tape 4 such as the laminate type tape and the color tone of the image firmed in the heat sensitive layers 42 and observed not through the base layer 41 of the heat sensitive tape 4 such as the receptor type tape. Hence, the thermal printer 1 can form an image on the heat sensitive tape 4 with the equivalent color tone regardless of the viewing direction to the heat sensitive tape 4.

The colors of cyan, magenta, and yellow are examples of "first color", "second color", and "third color". The tape 9 is an example of a "multilayered heat sensitive printing medium". The heat generating elements 11 are example of "heat generating element". The step S14 performed by the CPU 91 is an example of "creation process". The step S21 performed by the CPU 91 is an example of "driving process". The CPU 91 acquiring viewing direction, thickness, ratio of thickness, and refractive index of the base layer 41 performed in the steps S2 and S12 is an example of "detection unit". The thermal printer 1 is an example of a "printing device".

Various modifications are conceivable. For example, the base layer 41 may be a foaming PET film. The base layer 41 may be a resin film made from, for example, polyethylene (PE), polypropylene (PP), ethylene-vinylacetate copolymer (EVA), ethylene-methacrylic acid copolymer (EMMA), polybutene (PB), polybutadiene (BDR), polymethylpentene (PMP), polyethylene naphthalate (PEN), polybutylene terephthalate (PBT), polyimide (PI), polyether imide (PEI), polyether ketone (PEK), polyether ether ketone (PEEK), nylon (NY), polyamide (PA), polycarbonate (PC), polystyrene (PS), polystyrene foam (FS/HPS), polyvinylchloride (PVC), polyvinylidene chloride (PVDC), saponified ethylene-vinylacetate copolymer (EVOH), polyvinyl alcohol (PVA), ordinary cellophane (PT), waterproof cellophane (MST), polyacrylonitrile (PAN), vinylon (VL), polyurethane (PU), and triacetyl cellulose (TAC). These resin films may be foaming resin film or non-foaming resin film.

Further, the base layer 41 may be metal foil such as aluminum foil and cupper foil, vacuum vapor deposition film (VM), and various types of papers such as translucent paper, Japanese paper, fine paper, dustless paper, glassine paper, clay coated paper, resin coated paper, laminate sheet such as polyethylene laminate sheet and polypropylene laminate sheet, synthetic paper, and kraft paper. Further, the base layer 41 may be non-woven fabric and a glass cloth. The base layer 41 of the receptor type tape needs not have visible light transmittance.

For example, the electricity energization pattern table may contains various energization patters subdividing the pulses appearing in the electricity energization patterns C, M, Y, R1 through R4, G, B1, B2, K1, and K2. The heat sensitive tape 4 may be constituted by two heat sensitive layers 42 or not less than four heat sensitive layers 42. Further, the colors of R, G, B, K and other colors may be selected instead of the colors C, M, Y of each heat sensitive layer 42. Further, each heat sensitive layers 42 may develop the same color hut depth of the color is different from each other. Incidentally, in case the heat sensitive layers 42 is constituted by the four heat sensitive layers 42, the color of the fourth layer is preferably K.

Further, instead of the CPU 91, ASIC (application specific integrated circuits) and FPGA (field programmable gate array) are available as the processor. Further, distributed processing by a plurality of processors may be employed for the tape creation process. Further, any non-transitory computer readable medium is available as long as the medium can retain the information regardless of the period of storing the information. The non-transitory computer readable medium may not include the transitory medium (for example, signals to be transmitted). The program may be downloaded (transmitted as transmission signals) from a server connected to a network, and may be stored in the flash memory 92. In the latter case, the program may be stored in the non-transitory computer readable medium such as a hard disk drive provided in the server. The present disclosure also provides a non-transitory computer readable storage medium storing therein the print data generating program. Incidentally, the above-described modifications may be suitably combined together avoiding technically conflicting combination.

In the steps S2 through S3 of the tape creation process, the CPU 91 acquires the kind of the tape 9 from the medium detection switch 310 on the basis of the cassette information stored in the flash memory 92, to thus determine the viewing direction. However, the information on viewing direction may be input by the user through the keyboard 3 when the tape cassette 30 is attached to the receiving portion 8.

Program for performing the steps S11 through S14 may be installed as a printer driver in the external terminal 100, and executed in the tape creation process. In this case, the external terminal 100 acquires information on viewing direction from the thermal printer 1, and then performs the steps S11 through S14 to create the print data. The created print data is then transmitted to the thermal printer 1 where printing operation is performed. Further, the user may use a keyboard and a mouse of the external terminal 100 for inputting the information on viewing direction in a case where the information the viewing direction is to be inputted by the user in the above modification.

Further, the external terminal 100 may create print data associated with the viewing direction Y1 and another print data associated with the printing direction Y2, and transmit the created print data to the thermal printer 1 for printing operation. In this case, the thermal printer 1 may select the print data corresponding to the viewing direction in accordance with the determination result of the viewing direction to perform printing on the tape 9. Further, the external terminal 100 may exclusively create print data associated with the printing direction Y2, and transmit the print data to the thermal printer 1. In the latter case, in the thermal printer 1, the electricity energization patterns R1, B1, K1 in the command contained in the print data may be rewritten to the electricity energization patterns R2, B2, K2 in a case where the viewing direction is Y1 as a result of determination in S2 for printing on the tape 9.

Further, in the step S12, the thickness, the ratio of thickness, and refractive index of the base layer 41 are acquired as parameters. However, such acquisition may be omitted. In this case, in the process performed in the step S13, determination of the electricity energization pattern on the basis of the information on the parameters may be omitted.

While the description has been made in detail with reference to the specific embodiment and modifications, it would be apparent to those skilled in the art that various changes and modifications may be made therein without departing from the scope of the disclosure.

What is claimed is:

1. A printing device configured to print a multi-layer thermal printing medium, the multi-layer thermal printing medium comprising:
   a base layer having visible light transparency, the base layer having thickness in a thickness direction, the base layer having a first surface orthogonal to the thickness direction and a second surface opposite the first surface; and
   a heat sensitive multi-layer formed on the first surface as a whole, the heat sensitive multi-layer comprising:
      a first heat sensitive layer having visible light transparency, the first heat sensitive layer being colored into a first color when heated to a temperature equal to or higher than a first temperature; and
      a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer, the printing device comprising:

a thermal head having a plurality of heat generating elements configured to form images on the heat sensitive multi-layer; and a controller configured to perform:

detecting whether a viewing direction of the heat sensitive multi-layer is the thickness direction to view from the second surface toward the first surface or a direction opposite the thickness direction to view from the first surface toward the second surface;

creating, based on pixel-based image data, print data to be applied to each of the plurality of heat generating elements; and driving selected ones of the plurality of heat generating elements to form images on the heat sensitive multi-layer in response to the print data, wherein, in the creating, the created print data is such that color development states of the first color and the second color according to the detected viewing direction are differentiated from color development states of the first color and the second color according to an undetected viewing direction.

2. The printing device according to claim 1, wherein, in the creating, the controller is configured to further perform creating the print data which causes images for forming on the heat sensitive multi-layer to be colored in conformance with the result of detection of the viewing direction.

3. The printing device according to claim 1, wherein, in the creating, the controller is configured to further perform creating the print data which causes images for forming on the heat sensitive multi-layer to be positioned in conformance with the result of detection of the viewing direction.

4. The printing device according to claim 1, wherein, in the detecting, the controller is configured to further perform detecting relevant information on the thickness of the base layer, and wherein, in the creating, the created print data is such that color development states of the first color and the second color according to the detected viewing direction and the detected relevant information on the thickness of the base layer are differentiated from color development states of the first color and the second color according to an undetected viewing direction and an undetected relevant information on the thickness of the base layer.

5. The printing device according to claim 1, wherein, in the detecting, the controller is configured to further perform detecting relevant information on refractive index of the base layer, and wherein, in the creating, the created print data is such that color development states of the first color and the second color according to the detected viewing direction and the detected relevant information on refractive index of the base layer are differentiated from color development states of the first color and the second color according to an undetected viewing direction and an undetected relevant information on refractive index of the base layer.

6. The printing device according to claim 1, wherein the heat sensitive multi-layer comprises a plurality of heat sensitive layers including the first heat sensitive layer and the second heat sensitive layer, and wherein, in the creating, the controller is configured to further perform creating the print data on a basis of the image data so as to form images on each of at least two heat sensitive layers of the plurality of heat sensitive layers.

7. The printing device according to claim 1, wherein the heat sensitive multi-layer comprises a plurality of heat sensitive layers including the first heat sensitive layer and the second heat sensitive layer, and wherein, in the creating, the controller is configured to further perform creating the print data which causes a timing of the color development occurring in each of the plurality of heat sensitive layers to be a timing in conformance with the result of detection of the viewing direction.

8. The printing device according to claim 7, wherein the heat sensitive multi-layer comprises a plurality of heat sensitive layers including the first heat sensitive layer and the second heat sensitive layer, and wherein, in the creating, the controller is configured to further perform creaking the print data in which color developing timing of each of the plurality of heat sensitive layers is replaced with another color developing timing of another one of the plurality of heat sensitive layers.

9. The printing device according to claim 1, wherein the heat sensitive multi-layer comprises a plurality of heat sensitive layers including the first heat sensitive layer and the second heat sensitive layer, and wherein, in the creating, the controller is configured to further perform creating the print data in which the color developing area of at least one of the plurality of heat sensitive layers is different from another one of the plurality of heat sensitive layer in conformance with the result of detection of the viewing direction.

10. The printing device according to claim 1, wherein the heat sensitive multi-layer comprises a plurality of heat sensitive layers including the first heat sensitive layer and the second heat sensitive layer, wherein, in the creating, the controller is configured to further perform creating the print data in which the color developing area of far side heat sensitive layer in the viewing direction is greater than the color developing area of near side heat sensitive layer in the viewing direction m conformance with the result of detection of the viewing direction.

11. The printing device according to claim 1, wherein the heat sensitive multi-layer further comprises a third heat sensitive layer having visible light transparency, the third heat sensitive layer being colored into a third color When heated to a temperature equal to or higher than a third temperature higher than the second temperature, the third heat sensitive layer being positioned farther in the thickness direction than the second heat sensitive layer from the base layer.

12. A printing device configured to print a multi-layer thermal printing medium, the multi-layer thermal printing medium comprising:

a base layer having visible light transparency, the base layer having thickness in a thickness direction, the base layer having a first surface orthogonal to the thickness direction and a second surface opposite the first surface; and a heat sensitive multi-layer formed on the first surface as a whole, the heat sensitive multi-layer comprising:

a first heat sensitive layer having visible light transparency, the first heat sensitive layer being colored into a first color when heated to a temperature equal to or higher than a first temperature; and a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer, the printing device comprising:

a thermal head having a plurality of heat generating elements configured to form images on the heat sensitive multi-layer; and a controller configured to perform:

detecting relevant information on the thickness of the base layer;

creating, based on pixel-based image data, print data to be applied to each of the plurality of heat generating elements; and driving selected ones of the plurality of heat generating elements to form images on the heat sensitive multi-layer in response to the print data, wherein, in the creating, the created print data is such that color development states of the first color and the second color according to the detected relevant information on the thickness of the base layer are differentiated from color development states of the first color and the second color according to an undetected relevant information on the thickness of the base layer.

13. A printing device configured to print a multi-layer thermal printing medium, the multi-layer thermal printing medium comprising:

a base layer having visible light transparency, the base layer having thickness in a thickness direction, the base layer having a first surface orthogonal to the thickness direction and a second surface opposite the first surface; and a heat sensitive multi-layer formed on the first surface as a whole, the heat sensitive multi-layer comprising:

a first heat sensitive layer having visible light transparency, the first heat sensitive layer being colored into a first color when heated to a temperature equal to or higher than a first temperature; and a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer, the printing device comprising:

a thermal head having a plurality of heat generating elements configured to form images on the heat sensitive multi-layer; and a controller configured to perform:

detecting relevant information on refractive index of the base layer;

creating, based on pixel-based image data, print data to be applied to each of the plurality of heat generating elements; and driving selected ones of the plurality of heat generating elements to form images on the heat sensitive multi-layer in response to the print data, wherein, in the creating, the created print data is such that color development states of the first color and the second color according to the detected relevant information on refractive index of the base layer are differentiated from color development states of the first color and the second color according to an undetected relevant information on refractive index of the base layer.

14. A non-transitory computer readable storage medium storing a set of computer-readable instructions creating print data installed on and executed by a computer provided in a printing device, the printing device comprising a thermal head having a plurality of heat generating elements and the computer configured to drive the plurality of heat generating elements, the print data being used for printing image on a multi-layer thermal printing medium, the multi-layer thermal printing medium comprising:

a base layer having visible light transparency, the base layer having thickness in a thickness direction, the base layer having a first surface orthogonal to the thickness direction and a second surface opposite the first surface; and a heat sensitive multi-layer formed on the first surface as a whole, the heat sensitive multi-layer comprising:

a first heat sensitive layer having visible light transparency, the first heat sensitive layer being colored into a first color when heated to a temperature equal to or higher than a first temperature; and a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer, the set of computer-readable instructions comprising:

detecting whether a viewing direction of the heat sensitive multi-layer is the thickness direction to view from the second surface toward the first surface or a direction opposite the thickness direction to view from the first surface toward the second surface;

acquiring the viewing direction detected in the detecting; and creating, based on pixel-based image data, the print data to be applied to each of the plurality of heat generating elements, the created print data being such that color development states of the first color and the second color according to the detected viewing direction are differentiated from color development states of the first color and the second color according to an undetected viewing direction.

15. A non-transitory computer readable storage medium storing a set of computer-readable instructions creating a print data installed on and executed by a computer provided in a printing device, the printing device comprising a thermal head having a plurality of heat generating elements and the computer configured to drive the plurality of heat generating elements, the print data being used for printing image on a multi-layer thermal printing medium, the multi-layer thermal printing medium comprising:

a base layer having visible light transparency, the base layer having thickness in a thickness direction, the base layer having a first surface orthogonal to the thickness direction and a second surface opposite the first surface; and a heat sensitive multi-layer formed on the first surface as a whole, the heat sensitive multi-layer comprising:
  a first heat sensitive layer having visible light transparency, the first heat sensitive layer being colored into a first color when heated to a temperature equal to or higher than a first temperature; and
  a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer,
the set of computer-readable instructions comprising:
  detecting relevant information on the thickness of the base layer; and
  creating, based on pixel-based image data, print data to be applied to each of the plurality of heat generating elements, the creaked print data being such that color development states of the first color and the second color according to the detected relevant information on the thickness of the base layer are differentiated from color development states of the first color and the second color according to an undetected relevant information on the thickness of the base layer.

16. A non-transitory computer readable storage medium storing a set of computer-readable instructions creating a print data installed on and executed by a computer provided in a printing device, the printing device comprising a thermal head having a plurality of heat generating elements and the computer configured to drive the plurality of heat generating elements, the print data being used for printing image on a multi-layer thermal printing medium, the multi-layer thermal printing medium comprising:
  a base layer having visible light transparency, the base layer having thickness in a thickness direction, the base layer having a first surface orthogonal to the thickness direction and a second surface opposite the first surface; and
  a heat sensitive multi-layer formed on the first surface as a whole, the heat sensitive multi-layer comprising:
    a first heat sensitive layer having visible light transparency, the first heat sensitive layer being colored into a first color when heated to a temperature equal to or higher than a first temperature; and
    a second heat sensitive layer having visible light transparency, the second heat sensitive layer being colored into a second color when heated to a temperature equal to or higher than a second temperature higher than the first temperature, the second heat sensitive layer being positioned farther in the thickness direction than the first heat sensitive layer from the base layer,
the set of computer-readable instructions comprising:
  detecting relevant information on refractive index of the base layer; and
  creating, based on pixel-based image data, print data to be applied to each of the plurality of heat generating elements, the created print data being such that color development states of the first color and the second color according to the detected relevant information on refractive index of the base layer are differentiated from color development states of the first color and the second color according to an undetected relevant information on refractive index of the base layer.

* * * * *